(12) United States Patent
Kimura et al.

(10) Patent No.: US 11,289,037 B2
(45) Date of Patent: Mar. 29, 2022

(54) IMAGE PROCESSING DEVICE, DISPLAY DEVICE, AND IMAGE PROCESSING METHOD

(71) Applicant: Sony Corporation, Tokyo (JP)

(72) Inventors: Hiroaki Kimura, Tokyo (JP);
Harunobu Kamei, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 17/046,140

(22) PCT Filed: Mar. 22, 2019

(86) PCT No.: PCT/JP2019/012181
§ 371 (c)(1),
(2) Date: Oct. 8, 2020

(87) PCT Pub. No.: WO2019/225136
PCT Pub. Date: Nov. 28, 2019

(65) Prior Publication Data
US 2021/0035511 A1 Feb. 4, 2021

(30) Foreign Application Priority Data
May 22, 2018 (JP) .............................. JP2018-097953

(51) Int. Cl.
*G09G 3/36* (2006.01)

(52) U.S. Cl.
CPC ....... *G09G 3/36* (2013.01); *G09G 2320/0238* (2013.01); *G09G 2320/0626* (2013.01); *G09G 2360/144* (2013.01)

(58) Field of Classification Search
CPC ............ G09G 3/36; G09G 2320/0238; G09G 2320/0626; G09G 2360/144
See application file for complete search history.

(56) References Cited

U.S. PATENT DOCUMENTS

2004/0095558 A1  5/2004  Whitehead et al.
2005/0248520 A1  11/2005  Feng et al.
(Continued)

FOREIGN PATENT DOCUMENTS

CN  107644608 A  1/2018
JP  2004-523001 A  7/2004
(Continued)

OTHER PUBLICATIONS

International Search Report dated May 21, 2019 in PCT/JP2019/012181, 2 pages.

*Primary Examiner* — Amare Mengistu
*Assistant Examiner* — Jennifer L Zubajlo
(74) *Attorney, Agent, or Firm* — Oblon, McClelland, Maier & Neustadt, L.L.P.

(57) ABSTRACT

In a display device with two liquid crystal cells, image quality deterioration depending on brightness and darkness of an environment is reduced. For this purpose, as an image signal for a liquid crystal display panel in which a display image is generated by light passing through a rear liquid crystal cell and a front liquid crystal cell, an image processing unit generates a rear image signal for the rear liquid crystal cell and a front image signal for the front liquid crystal cell. This image processing unit performs a spatial filter process on the rear image signal. Then, a filter control unit controls the spatial filter process performed on the rear image signal in the image processing unit on the basis of a detection value of an illuminance sensor that detects illuminance around the display panel.

11 Claims, 17 Drawing Sheets

(56) References Cited

U.S. PATENT DOCUMENTS

| | | | |
|---|---|---|---|
| 2007/0242028 A1 | 10/2007 | Kitagawa et al. | |
| 2011/0215991 A1* | 9/2011 | Nakazaki | G09G 5/00 345/4 |
| 2012/0038693 A1* | 2/2012 | Kang | H04N 9/3126 345/691 |
| 2013/0215093 A1* | 8/2013 | Bergquist | G09G 3/3426 345/207 |
| 2014/0218557 A1* | 8/2014 | Ebe | H04N 5/35721 348/222.1 |
| 2016/0170702 A1* | 6/2016 | Jiang | G02F 1/133528 345/618 |
| 2019/0027101 A1* | 1/2019 | Lin | G09G 5/377 |

FOREIGN PATENT DOCUMENTS

| | | |
|---|---|---|
| JP | 2007-310376 A | 11/2007 |
| JP | 2008-191269 A | 8/2008 |
| JP | 2011-154224 A | 8/2011 |
| JP | 2011-203730 A | 10/2011 |
| JP | 2014-150498 A | 8/2014 |
| JP | 2015-191053 A | 11/2015 |

* cited by examiner

FIG. 2
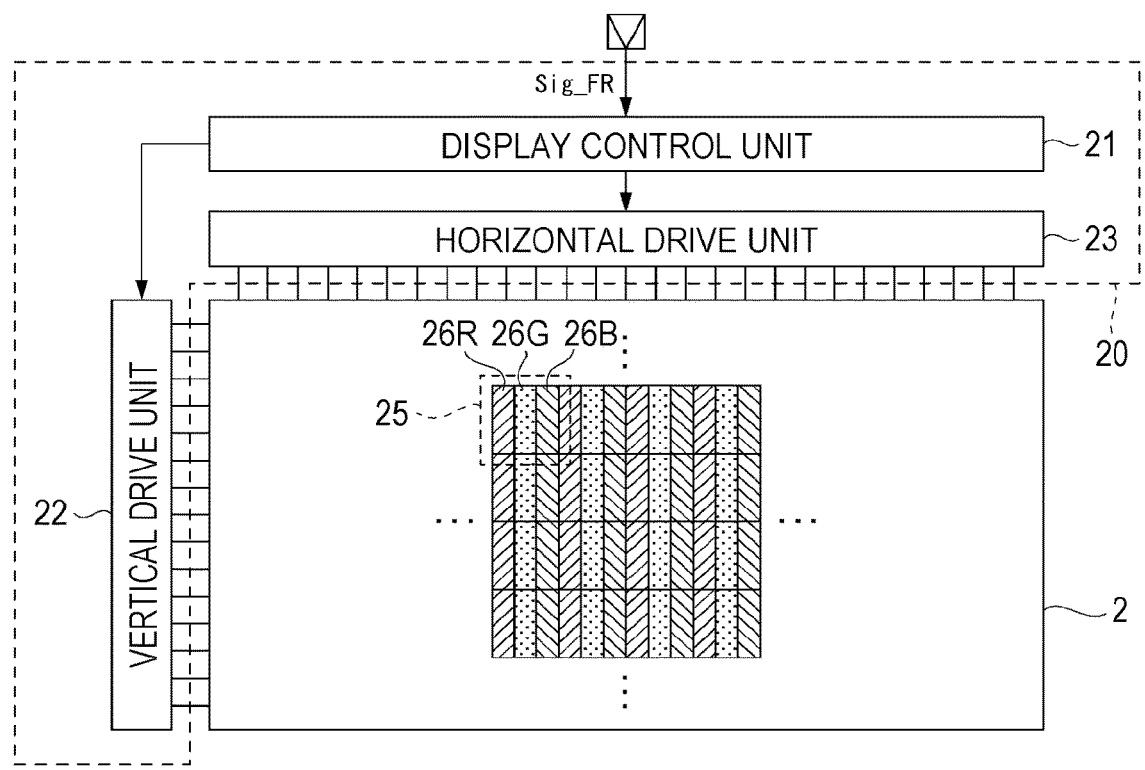
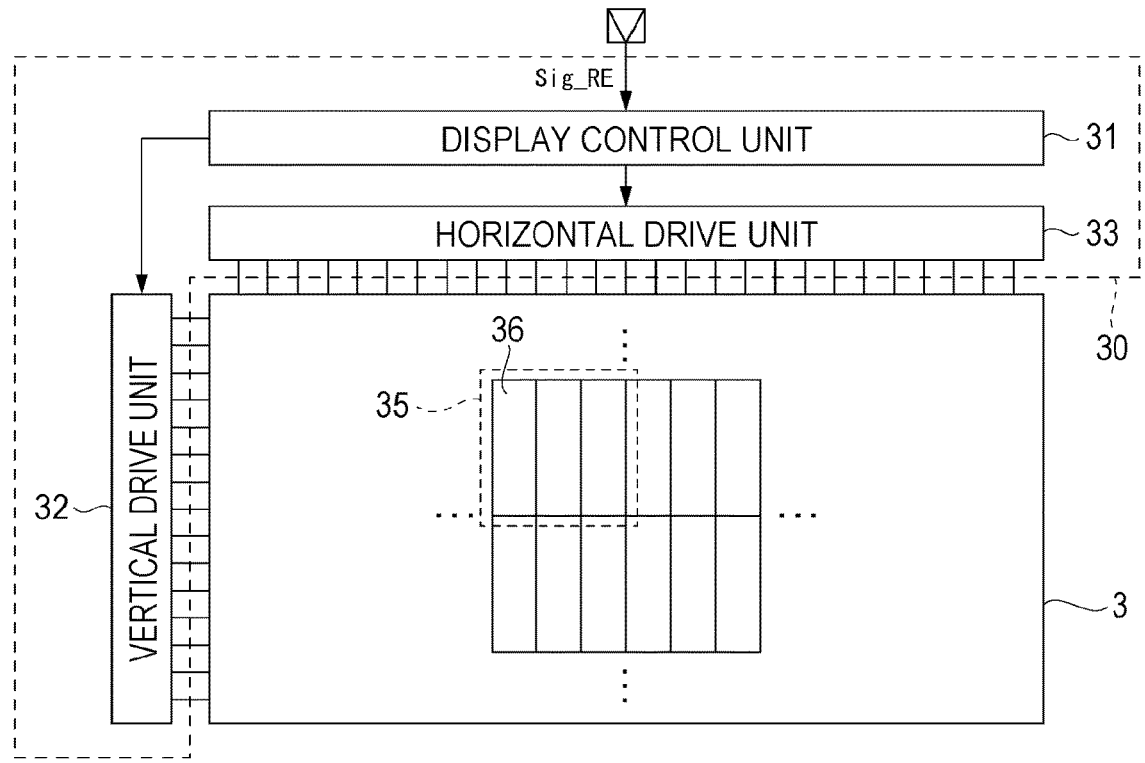

FIG. 6
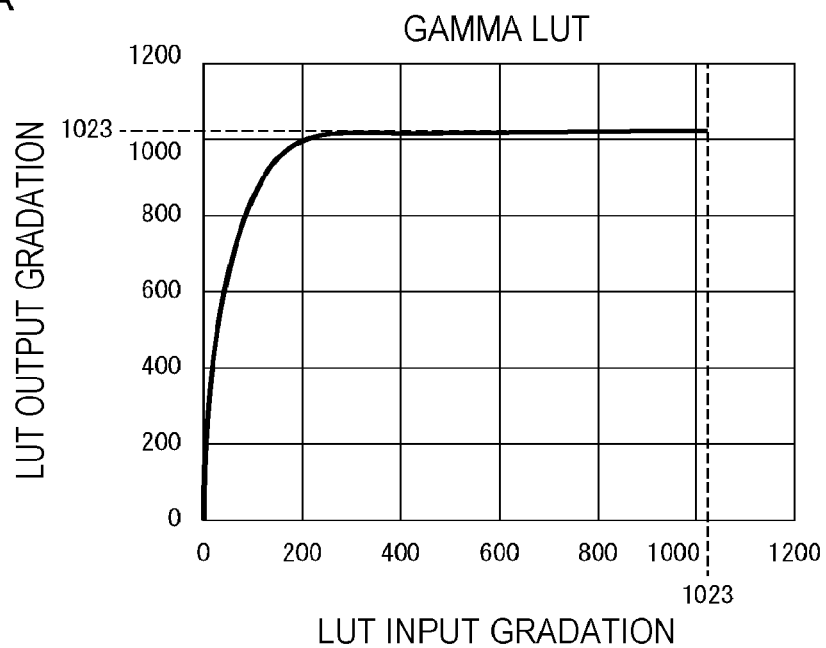
A
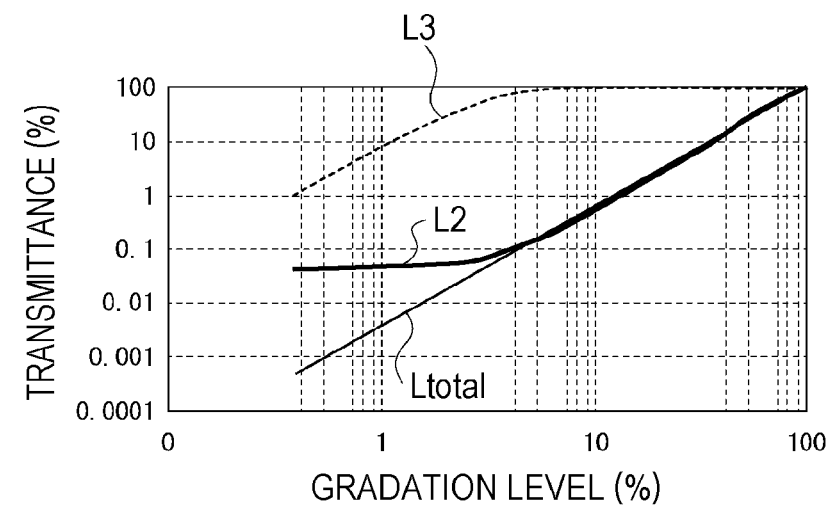
B

FIG. 8
A
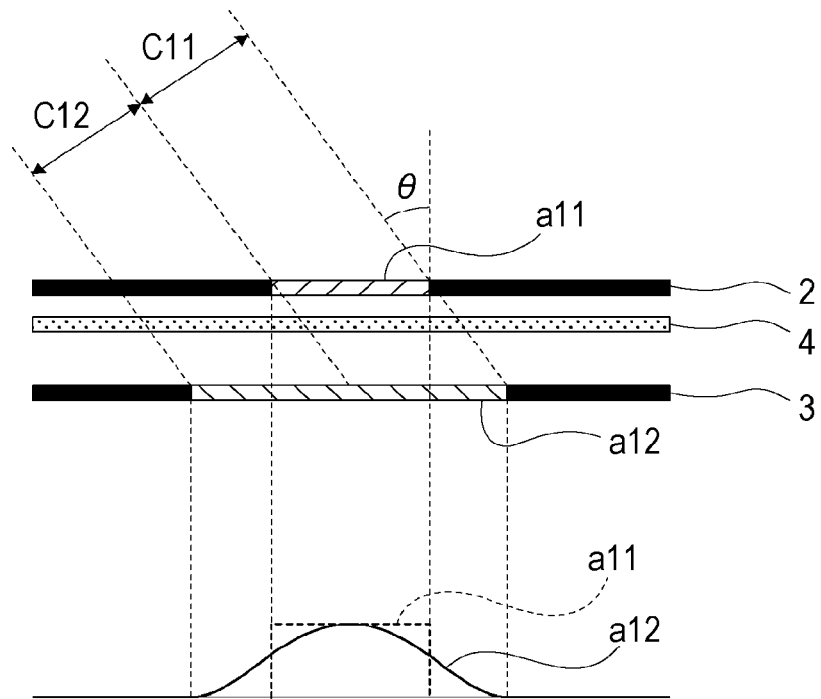
B
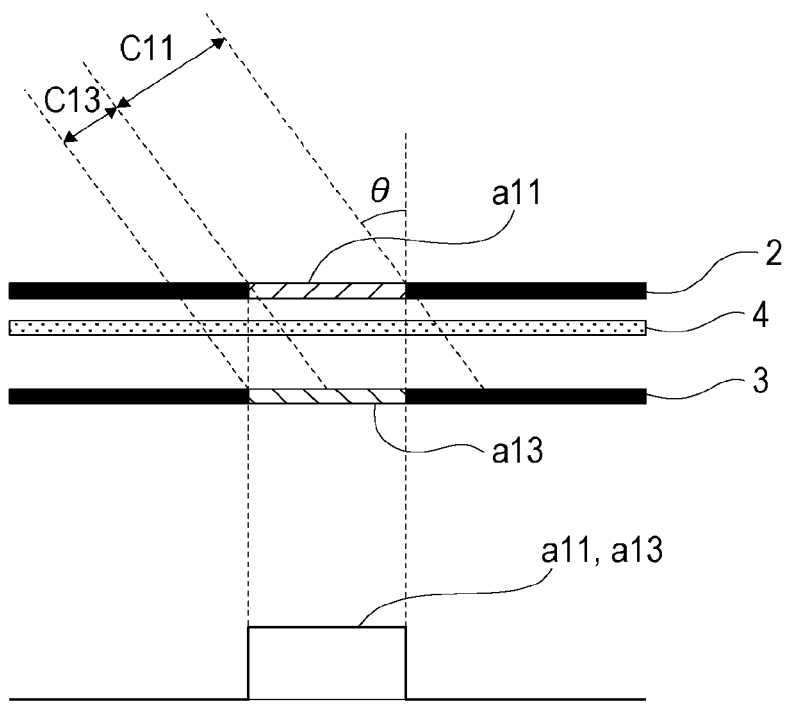

FIG. 13
A   INPUT SIGNAL (1dot)
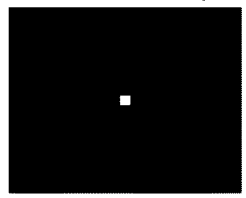
1dot WHITE, BLACK BACKGROUND
B   FRONT IMAGE
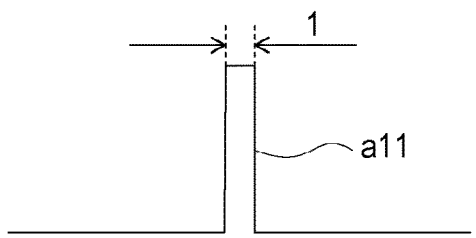
C   REAR IMAGE
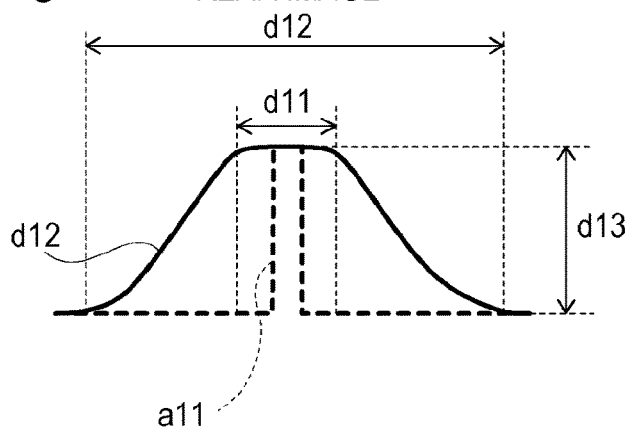
D
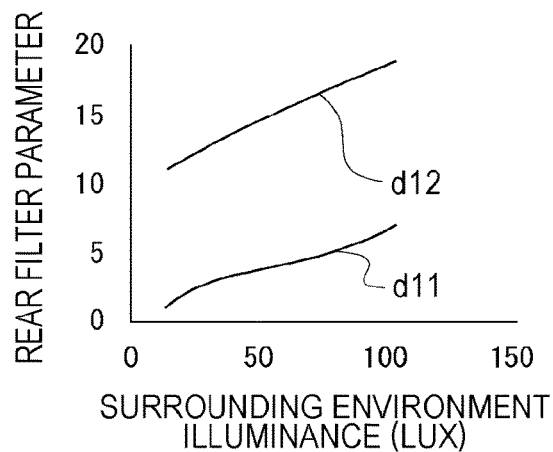

FIG. 14
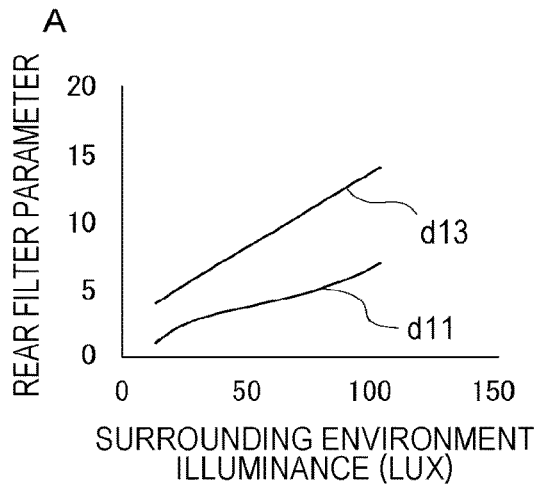
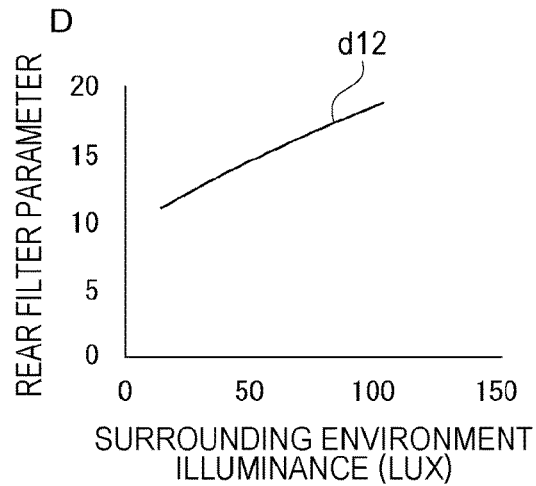
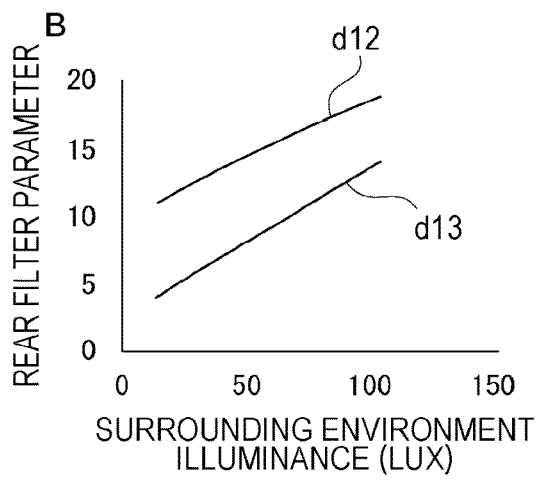
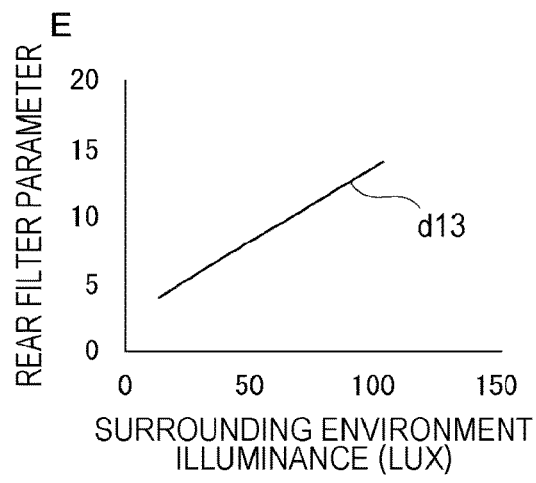
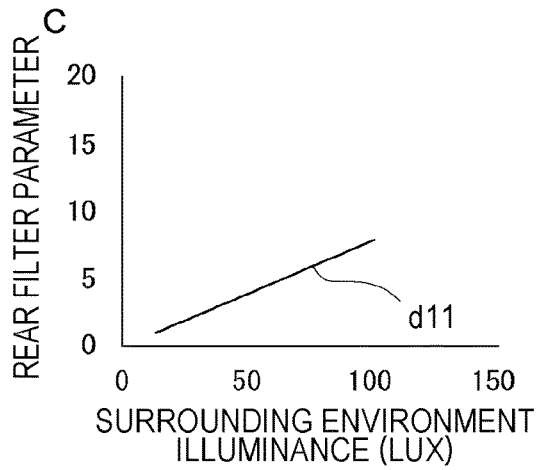
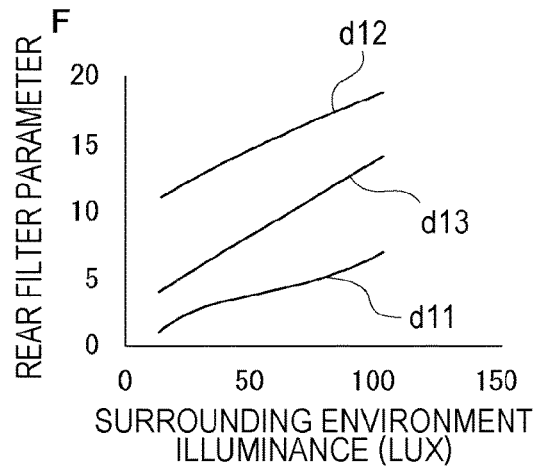

IMAGE PROCESSING DEVICE, DISPLAY DEVICE, AND IMAGE PROCESSING METHOD

TECHNICAL FIELD

The present technology relates to an image processing device, a display device, and an image processing method, and more particularly relates to processing an image signal for a display panel in which a display image is generated by light passing through a rear liquid crystal cell and a front liquid crystal cell.

BACKGROUND ART

Various structures are known as liquid crystal display devices. Patent Document 1 below discloses a dual liquid crystal cell type liquid crystal display device as one of the structures.

CITATION LIST

Patent Document

Patent Document 1: Japanese Patent Application Laid-Open No. 2015-191053

SUMMARY OF THE INVENTION

Problems to be Solved by the Invention

In the dual liquid crystal cell type display device, while a high contrast ratio can be achieved by controlling gradation with the rear liquid crystal cell, a luminance viewing angle tends to be narrower than that of a single liquid crystal cell. As a method of improving this, there may be a case where a spatial filter is used to blur an image in image generation of the rear liquid crystal cell close to a backlight.

However, when blurring the image of the rear liquid crystal cell using the spatial filter, even if the display (luminance) is constant, luminosity (how to perceive luminance) of the human eye changes depending on surrounding environment illuminance of the display device, and if the surrounding environment illuminance is bright, the display device looks relatively dark and thus the viewing angle is felt narrower, or if the surrounding environment illuminance is dark, the luminance viewing angle is felt wider but image quality deterioration due to contrast reduction called flare (black float) may appear to be emphasized.

An object of the present technology is to reduce the image quality deterioration due to such surrounding environment illuminance in a case of using the dual liquid crystal cell type display device.

Solutions to Problems

The image processing device according to the present technology includes an image processing unit that generates, as an image signal for a display panel in which a display image is generated by light passing through a rear liquid crystal cell and a front liquid crystal cell, a rear image signal for the rear liquid crystal cell and a front image signal for the front liquid crystal cell, and a filter control unit that controls a spatial filter process performed on the rear image signal in the image processing unit on the basis of a detection value of an illuminance sensor that detects illuminance around the display panel.

The image signal to be processed by the image processing device is an image signal used in a dual liquid crystal cell type liquid crystal display panel. The image processing device processes an image signal for each of a front liquid crystal cell and a rear liquid crystal cell of a dual liquid crystal cell type liquid crystal display panel. In this case, a spatial filter process may be performed on the rear image signal, and the spatial filter process is controlled according to the illuminance.

In the image processing device according to the present technology described above, it is conceivable that the image processing unit performs on the rear image signal the spatial filter process to make a transmission pixel range of an image in the rear liquid crystal cell larger than that of an image in the front liquid crystal cell.

That is, the spatial filter process is performed so as to blur the rear image. Specifically, a process like a low-pass filter for the rear image signal is performed so that the range of transmitting pixels on the rear liquid crystal cell side is enlarged to blur the image with respect to the image of the front liquid crystal cell by the front image signal.

In the image processing device according to the present technology described above, it is conceivable that the filter control unit variably controls a parameter that changes a filter characteristic in the spatial filter process on the basis of a detection value of the illuminance sensor.

That is, when the spatial filter process is performed on the rear image signal to make the transmission pixel range of the rear liquid crystal cell larger than the transmission pixel range of the front liquid crystal cell, the shape of the passing waveform (the shape of how the gradation value spreads) is made variable.

In the image processing device according to the present technology described above, it is conceivable that the parameter is a filter passage width of the rear image signal.

The filter passage width is the width of a range of the rear image signal that becomes gentle by the spatial filter process (the width including a foot portion of the signal by a low pass process). That is, this corresponds to the range (blurred range) of the transmission pixels in a case where the range of the transmission pixels of the rear liquid crystal cell by the rear image signal is made larger than the range of the transmission pixels of the front liquid crystal cell. The filter passage width is made variable according to the illuminance.

In the image processing device according to the present technology described above, it is conceivable that the parameter is a peak width of the rear image signal.

The peak width is the width of a range in which the rear image signal that becomes gentle by the spatial filter process is equal to the original gradation value (peak value) of the corresponding pixel. The peak width is made variable according to the illuminance.

In the image processing device according to the present technology described above, it is conceivable that the parameter is a peak value of the rear image signal.

The peak value is a gradation value of a peak of the rear image signal that becomes gentle by the spatial filter process. Normally, it is the original gradation value of the corresponding pixel, but this peak value is made variable according to the illuminance.

In the image processing device according to the present technology described above, it is conceivable that the filter control unit controls the spatial filter process so that an image blur range of the rear liquid crystal cell becomes narrower as illuminance as the detection value of the illuminance sensor becomes lower, and the image blur range of the rear liquid crystal cell becomes wider as the illuminance becomes higher.

The control of the image blur range is performed, for example, by controlling the filter shape of the rear image signal.

In the image processing device according to the present technology described above, it is conceivable that the filter control unit controls the spatial filter process so that a transmitted amount of light in the rear liquid crystal cell becomes smaller as illuminance as the detection value of the illuminance sensor becomes lower, and the transmitted amount of light in the rear liquid crystal cell becomes wider as the illuminance becomes higher.

The control of the transmitted amount of light is performed, for example, by controlling a peak value of gradation of the rear image signal.

In the image processing device according to the present technology described above, it is conceivable that when an illuminance change is detected with the detection value of the illuminance sensor, the filter control unit controls the spatial filter process so as to change a filter characteristic stepwise.

That is, when the illuminance change is detected, the filter shape according to the new illuminance is not changed at once, but is gradually changed.

In the image processing device according to the present technology described above, it is conceivable that when the detection value of the illuminance sensor becomes a value that exceeds a predetermined change width from a value when previous filter control is performed, the filter control unit performs variable control of the spatial filter process according to the illuminance change.

That is, the variable control of the spatial filter process is prevented from being unnecessarily performed due to a slight illuminance change.

A display device according to an embodiment of the present technology includes a display panel in which a display image is generated by light passing through a rear liquid crystal cell and a front liquid crystal cell, an illuminance sensor that detects illuminance around the display panel, and the image processing device described above.

In this display device, the display panel includes, for example, a light source unit, a rear liquid crystal cell, a diffusion layer, and a front liquid crystal cell, which are arranged in this order to form what is called a dual liquid crystal cell type liquid crystal display panel. A spatial filter control according to the illuminance is performed for the rear image signal for such a dual liquid crystal cell type liquid crystal display panel.

An image processing method according to the present technology performs an image processing procedure and a filter control procedure as a process performed by the image processing unit and the filter control unit in the image processing device described above.

Effects of the Invention

According to the present technology, by controlling a spatial filter process that blurs an image of a rear liquid crystal cell according to surrounding environment illuminance, it is possible to improve image quality by reducing an image defect and a flare (black float).

Note that the effects described here are not necessarily limited, and may be any effect described in the present disclosure.

BRIEF DESCRIPTION OF DRAWINGS

FIG. 2 is an explanatory diagram of a front liquid crystal cell and a rear liquid crystal cell of the embodiment.

FIG. 6 is an explanatory diagram of a gamma process of the embodiment.

FIG. 8 is an explanatory diagram of a state visually observed from an oblique direction in each case with or without the spatial filter process.

FIG. 13 is an explanatory diagram of parameter control of a spatial filter of the embodiment.

FIG. 14 is an explanatory diagram of parameter control of the spatial filter of the embodiment.

MODE FOR CARRYING OUT THE INVENTION

Hereinafter, an embodiment will be described in the following order.
<1. Configuration of display device>
<2. Configuration of dual cell image processing unit>
<3. Spatial filter control in embodiment>
<4. Process of first embodiment>
<5. Process of second embodiment>
<6. Summary and modification example>

For the sake of explanation, three primary colors, red, green, and blue, will be described as R, G, and B in alphabet, respectively.

1. Configuration of Display Device

Figure 1:
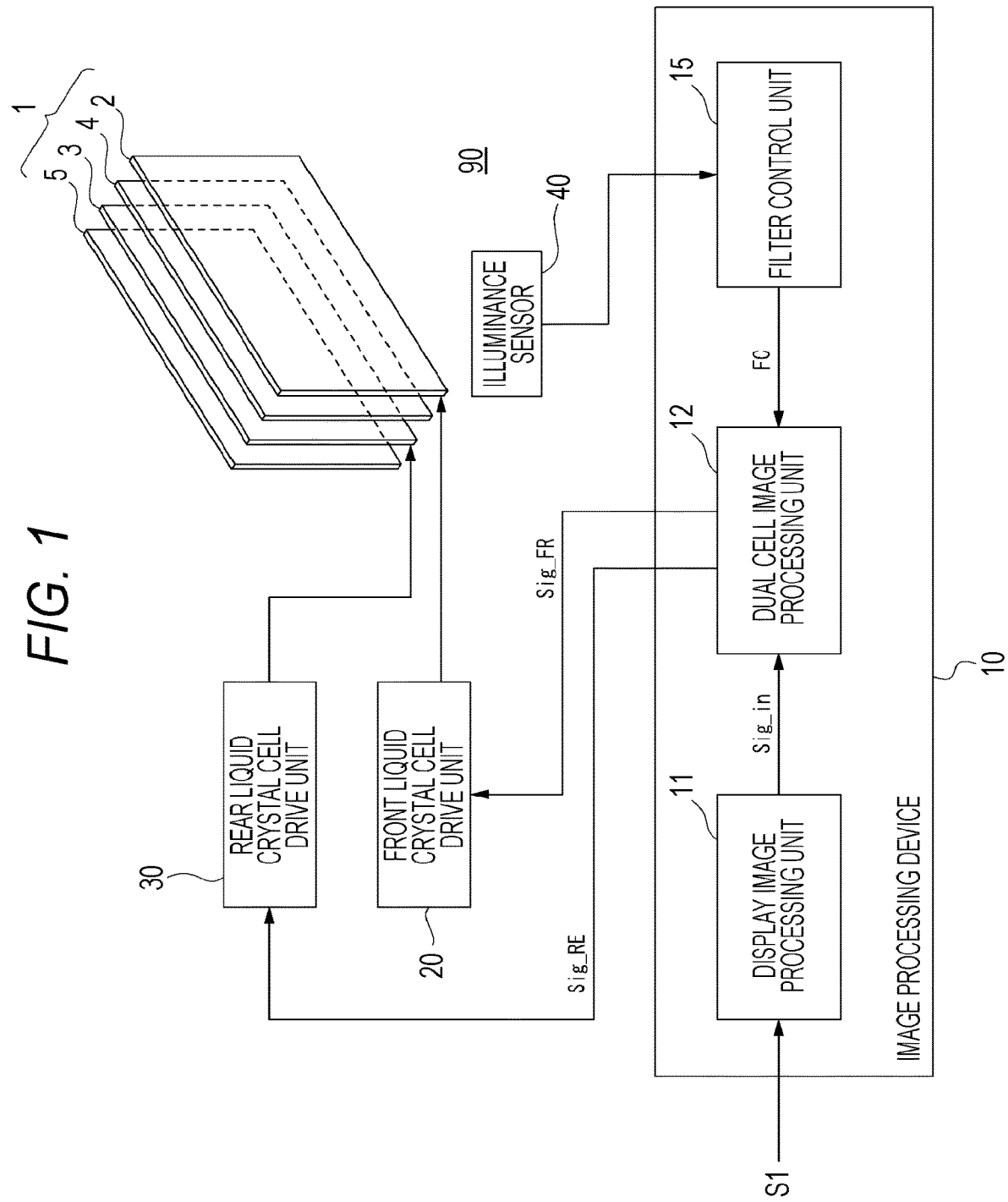
FIG. 1 is a block diagram of a display device of an embodiment of the present technology.

FIG. 1 illustrates a configuration of a display device 90 of the embodiment. The display device 90 has a liquid crystal display panel 1, an image processing device 10, a front liquid crystal cell drive unit 20, and a rear liquid crystal cell drive unit 30.

The liquid crystal display panel 1 is a dual cell type liquid crystal display panel and includes a front liquid crystal cell 2, a diffusion layer 4, a rear liquid crystal cell 3, and a backlight 5.

On a front side of the backlight 5, the rear liquid crystal cell 3, the diffusion layer 4, and the front liquid crystal cell 2 are arranged to be stacked in this order, and a viewer sees an image displayed from a front side of the front liquid crystal cell 2.

Each of the front liquid crystal cell 2 and the rear liquid crystal cell 3 forms one liquid crystal display panel, but in the present embodiment, the entire dual liquid crystal cell type display panel is referred to as a liquid crystal display panel 1.

The image processing device 10 performs signal processing for displaying on the liquid crystal display panel 1 with respect to an image signal S1 input as a color image signal (for example, a signal of ultra high definition (UHD) format, and the like).

The image processing device 10 has a display image processing unit 11, a dual cell image processing unit 12, and a filter control unit 15.

The display image processing unit 11 performs necessary decoding processing, luminance processing, color processing, resolution conversion, or the like on the input image signal S1, and supplies a processed image signal Sig_in to the dual cell image processing unit 12. At least at the stage of the image signal Sig_in, it is a color image signal indicating a gradation value of each color of R, G, and B.

The dual cell image processing unit 12, which will be described in detail later, performs processing corresponding to the dual cell type liquid crystal display panel 1.

That is, the dual cell image processing unit 12 performs signal processing on the input image signal Sig_in to generate and output an image signal for the front liquid crystal cell 2 (front image signal Sig_FR) and an image signal for the rear liquid crystal cell 3 (rear image signal Sig_RE).

The front image signal Sig_FR is a color image signal including R, G, and B gradation values. On the other hand, the rear image signal Sig_RE is a black and white (grayscale) image signal including grayscale gradation values.

The filter control unit 15 includes, for example, a microprocessor that performs arithmetic processing.

This filter control unit 15 controls a spatial filter process in the dual cell image processing unit 12. Although details of this will also be described later, the dual cell image processing unit 12 performs a spatial filter process so as to blur the image on the rear image signal Sig_RE. The filter control unit 15 controls a filter characteristic of this spatial filter process. Specifically, the filter control unit 15 performs a process of designating, for example, a parameter defining the filter characteristic by a control signal FC.

In particular, the filter control unit 15 performs such filter control on the basis of a detection value of an illuminance sensor 40.

The illuminance sensor 40 is mounted on, for example, the display device 90, detects illuminance due to environmental light in the surroundings, and supplies a detection signal thereof to the filter control unit 15.

For example, the illuminance sensor 40 has a detection window provided on a surface or the like of a casing as the display device 90, so as to detect illuminance. Particularly, it is arranged so as to detect illuminance on a front surface side of the liquid crystal display panel 1.

Note that the illuminance sensor 40 may be separate from the display device 90.

The front image signal Sig_FR output from the image processing device 10 is supplied to the front liquid crystal cell drive unit 20. The front liquid crystal cell drive unit 20 drives the front liquid crystal cell 2 on the basis of the front image signal Sig_FR to execute color image display.

The rear image signal Sig_RE output from the image processing device 10 is supplied to the rear liquid crystal cell drive unit 30. The rear liquid crystal cell drive unit 30 drives the rear liquid crystal cell 3 on the basis of the rear image signal Sig_RE to execute monochrome image display.

An example of structures of the front liquid crystal cell drive unit 20 and the front liquid crystal cell 2 is illustrated in FIG. 2A.

The front liquid crystal cell drive unit 20 has a display control unit 21, a vertical drive unit 22, and a horizontal drive unit 23, and drives the front liquid crystal cell 2 with these configurations.

The display control unit 21 supplies a control signal to the vertical drive unit 22 and also supplies image signals (signals according to the gradation values of R, G, and B) and a control signal to the horizontal drive unit 23 on the basis of the front image signal Sig_FR, so as to control them to operate in synchronization with each other.

The vertical drive unit 22 sequentially selects one horizontal line to be a target of display drive in the front liquid crystal cell 2 on the basis of the control signal supplied from the display control unit 21.

The horizontal drive unit 23 generates a pixel voltage for one horizontal line on the basis of the image signal and the control signal supplied from the display control unit 21, and supplies the pixel voltage to sub-pixels 26 (26R, 26G, and 26B) for one horizontal line selected by the vertical drive unit 22.

The front liquid crystal cell 2 has a plurality of pixels 25 arranged in a matrix.

Each pixel 25 has three sub-pixels 26R, 26G, and 26B.

The sub-pixel 26R has a red color filter, the sub-pixel 26G has a green color filter, and the sub-pixel 26B has a blue color filter.

Pixel voltages are supplied to these sub-pixels 26R, 26G, and 26B from the horizontal drive unit 23, respectively. Then, the sub-pixels 26R, 26G, and 26B are configured to change light transmittance according to the pixel voltages.

An example of structures of the rear liquid crystal cell drive unit 30 and the rear liquid crystal cell 3 are illustrated in FIG. 2B.

The rear liquid crystal cell drive unit 30 has a display control unit 31, a vertical drive unit 32, and a horizontal drive unit 33, and drives the rear liquid crystal cell 3 with these configurations.

The display control unit 31 supplies a control signal to the vertical drive unit 32 and also supplies image signals (signals according to the gradation values as grayscales) and a control signal to the horizontal drive unit 33 on the basis of the rear image signal Sig_RE, so as to control them to operate in synchronization with each other.

The vertical drive unit 32 sequentially selects one horizontal line to be a target of display drive in the front liquid crystal cell 2 on the basis of the control signal supplied from the display control unit 31.

The horizontal drive unit 33 generates a pixel voltage for one horizontal line on the basis of the image signal and the control signal supplied from the display control unit 31, and supplies the pixel voltage to the sub-pixels 36 for one horizontal line selected by the vertical drive unit 32.

A plurality of pixels 35 is arranged in a matrix in the rear liquid crystal cell 3.

Each pixel 35 has three sub-pixels 36. Each sub-pixel 36 does not have a color filter. That is, each sub-pixel 26R, 26G, or 26B in the front liquid crystal cell 2 has a color filter of a corresponding color, but each sub-pixel 36 in the rear liquid crystal cell 3 does not have a color filter.

The same pixel voltage is supplied from the horizontal drive unit 33 to the three sub-pixels 36 belonging to one pixel 35. Then, the sub-pixels 36 are configured to change light transmittance according to the pixel voltage.

Note that the pixels 35 of the rear liquid crystal cell 3 may be configured such that a set of the three sub-pixels described above is configured as one electrode and as one pixel of a black matrix. That is, it may be not only a color filter-less but also a structure with no sub-pixels in respective liquid crystal structure elements such as a TFT, a transparent electrode, a wiring, and a black matrix. In that case, one pixel 35 corresponds to the three sub-pixels 26R, 26G, and 26B in the front liquid crystal cell 2.

Such a rear liquid crystal cell 3 can be manufactured by omitting the step of forming a color filter in the manufacturing process of a general-purpose liquid crystal display panel capable of displaying a color image. Therefore, in the display device 90, development cost and manufacturing cost can be reduced as compared with a case where a dedicated product is developed.

The backlight 5 illustrated in FIG. 1 emits light on the basis of a backlight control signal (not illustrated). The backlight 5 is arranged on a back side of the rear liquid crystal cell 3.

The backlight 5 includes a light emitting unit formed by, for example, an LED (Light Emitting Diode) to emit light.

Figure 3:
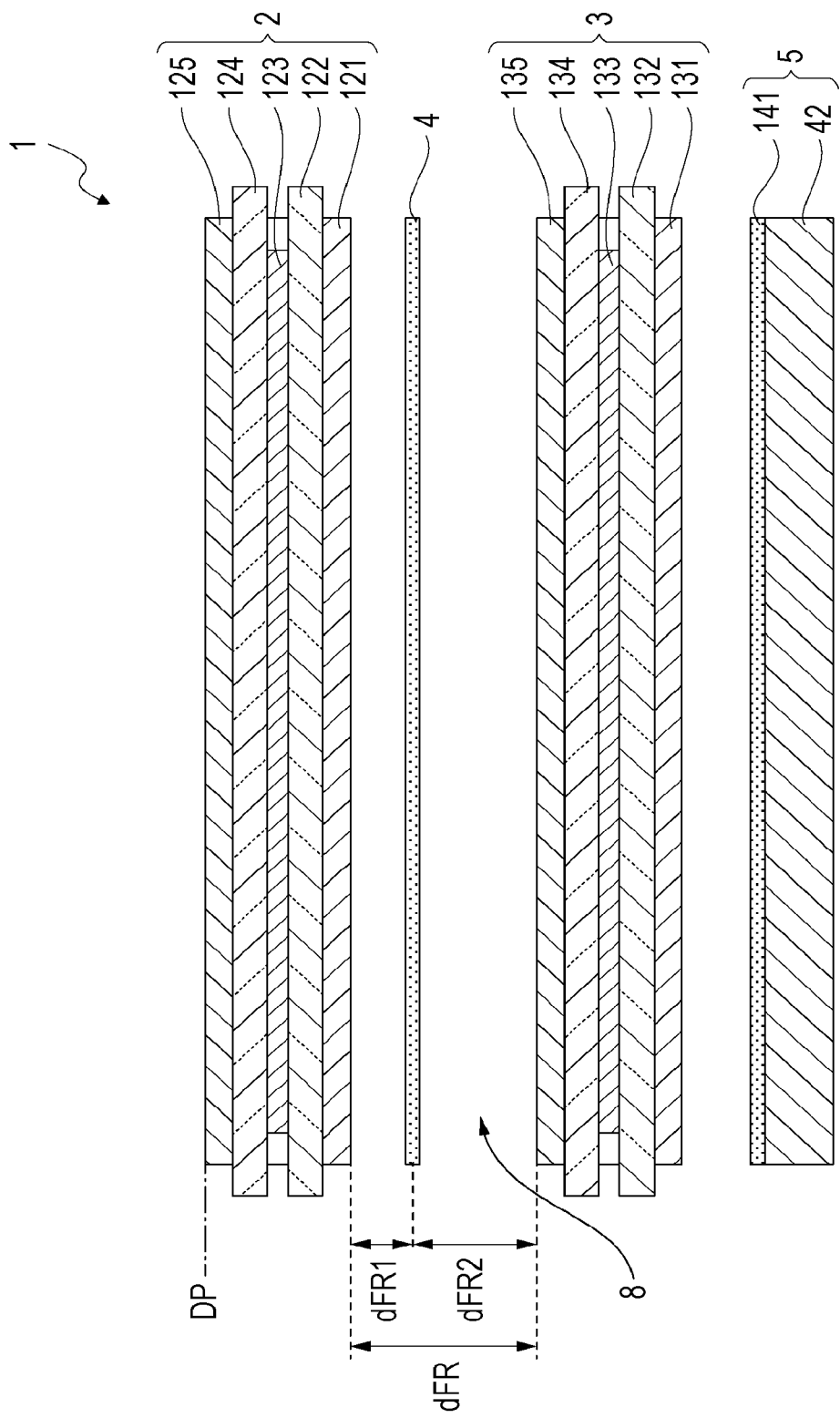
FIG. 3 is an explanatory diagram of an arrangement of a liquid crystal display panel of the embodiment.

FIG. 3 illustrates an arrangement configuration of the liquid crystal display panel 1.

As illustrated in the diagram, in the liquid crystal display panel 1, the backlight 5, the rear liquid crystal cell 3, the diffusion layer 4, and the front liquid crystal cell 2 are arranged in this order, and an upper surface of the front liquid crystal cell 2 in FIG. 3 is a display plane DP.

That is, light emitted from the backlight 5 passes through the backlight 5, the rear liquid crystal cell 3, the diffusion layer 4, and the front liquid crystal cell 2 so as to reach the viewer.

The front liquid crystal cell 2 and the rear liquid crystal cell 3 are arranged apart from each other. Then, a diffusion layer 4 is arranged in a gap 8 between the front liquid crystal cell 2 and the rear liquid crystal cell 3.

Note that as a configuration example, the cells of the front liquid crystal cell 2 and the rear liquid crystal cell 3 may be adhered to each other with an adhesive layer without a gap.

The front liquid crystal cell 2 has substrates 122 and 124, a liquid crystal layer 123, and polarizing plates 121 and 125.

The substrates 122 and 124 are formed with, for example, glass substrates, and are arranged so as to face each other.

A pixel electrode is formed for every sub-pixel 26 on a surface of the substrate 122 on the substrate 124 side, and a pixel voltage is applied by the horizontal drive unit 23 described above.

An electrode common to each of the sub-pixels 26 is formed on a surface of the substrate 124 on the substrate 122 side. Further, a color filter and a black matrix are formed on the substrate 124.

The liquid crystal layer 123 is sealed between the substrate 122 and the substrate 124, and has light transmittance that changes according to the pixel voltage applied to the pixel electrode of the substrate 122.

The polarizing plate 121 is attached to a light incident side of the substrate 122, and the polarizing plate 125 is attached to a light emitting side of the substrate 124. A transmission axis of the polarizing plate 121 and a transmission axis of the polarizing plate 125 intersect each other.

The rear liquid crystal cell 3 has substrates 132 and 134, a liquid crystal layer 133, and polarizing plates 131 and 135.

The substrates 132 and 134 are formed with, for example, glass substrates, and are arranged so as to face each other.

A pixel electrode is formed for every sub-pixel 26 on a surface of the substrate 132 on the substrate 134 side, and a pixel voltage is applied by the horizontal drive unit 33 described above.

Note that a structure having no sub-pixel as described above is also conceivable, and in this case, the pixel electrode is formed for every pixel 35.

An electrode common to each of the sub-pixels 36 is formed on the surface of the substrate 134 on the substrate 132 side. Further, a black matrix is formed on the substrate 134. Then, unlike the substrate 124 of the front liquid crystal cell 2, the substrate 134 has no color filter formed thereon.

The liquid crystal layer 133 is sealed between the substrate 132 and the substrate 134, and has transmittance of light that changes according to the pixel voltage applied to the pixel electrode of the substrate 132.

The polarizing plate 131 is attached to a light incident side of the substrate 132, and the polarizing plate 135 is attached to a light emitting side of the substrate 134. A transmission axis of the polarizing plate 131 and a transmission axis of the polarizing plate 135 intersect each other.

The diffusion layer 4 diffuses light incident from the rear liquid crystal cell 3 side. For the diffusion layer 4, for example, a diffusion film in which beads are randomly dispersed on or in a resin film can be used.

This diffusion layer 4 is for reducing moire in a display image. That is, in the liquid crystal display panel 1, since the front liquid crystal cell 2 and the rear liquid crystal cell 3, which are two liquid crystal display panels, are arranged so as to overlap with each other, moire may occur in the displayed image. Therefore, in the liquid crystal display panel 1, the diffusion layer 4 is arranged between the front liquid crystal cell 2 and the rear liquid crystal cell 3 to reduce the moire and suppress deterioration in image quality.

Although the diffusion layer 4 may be arranged at any position in the gap 8, it is desirably arranged on a side closer to the front liquid crystal cell 2 as illustrated in FIG. 3. That is, out of inter-panel distances dFR, a distance dFR1 between the diffusion layer 4 and the front liquid crystal cell 2 is desirably smaller than a distance dFR2 between the diffusion layer 4 and the rear liquid crystal cell 3 (dFR1<dFR2).

In this case, a transparent material layer may be formed in one or both of between the diffusion layer 4 and the front liquid crystal cell 2 and between the diffusion layer 4 and the rear liquid crystal cell 3.

Further, it is more desirable to dispose the diffusion layer 4 so as to be adjacent to the front liquid crystal cell 2 (dFR1=0). This is because the closer the diffusion layer 4 is to the front liquid crystal cell 2, the more effectively the moire can be suppressed and also the sharpness can be increased.

The higher the degree of diffusion (haze value) of the diffusion layer 4, the more effectively the moire can be suppressed. For example, if the haze value is 90% or more, the degree of freedom in designing the inter-panel distance dFR to obtain desired image quality can be increased. However, in a case where the haze value becomes high, there is a concern that the luminance will decrease. Thus, it is desirable to reduce the resolution of the rear liquid crystal cell 3 and remove the color filter.

Further, also in a case where the haze value of the diffusion layer 4 is low, desired image quality can be obtained by arranging the diffusion layer 4 close to the front liquid crystal cell 2, for example.

The backlight 5 has a diffusion plate 141 in addition to a light emitting array 42. The diffusion plate 141 diffuses light emitted from the light emitting array 42.

The light emitting array 42 is configured by arraying LEDs, for example.

2. Configuration of Dual Cell Image Processing Unit

A configuration of the dual cell image processing unit 12 will be described with reference to FIGS. 4 and 5.

Figure 4:
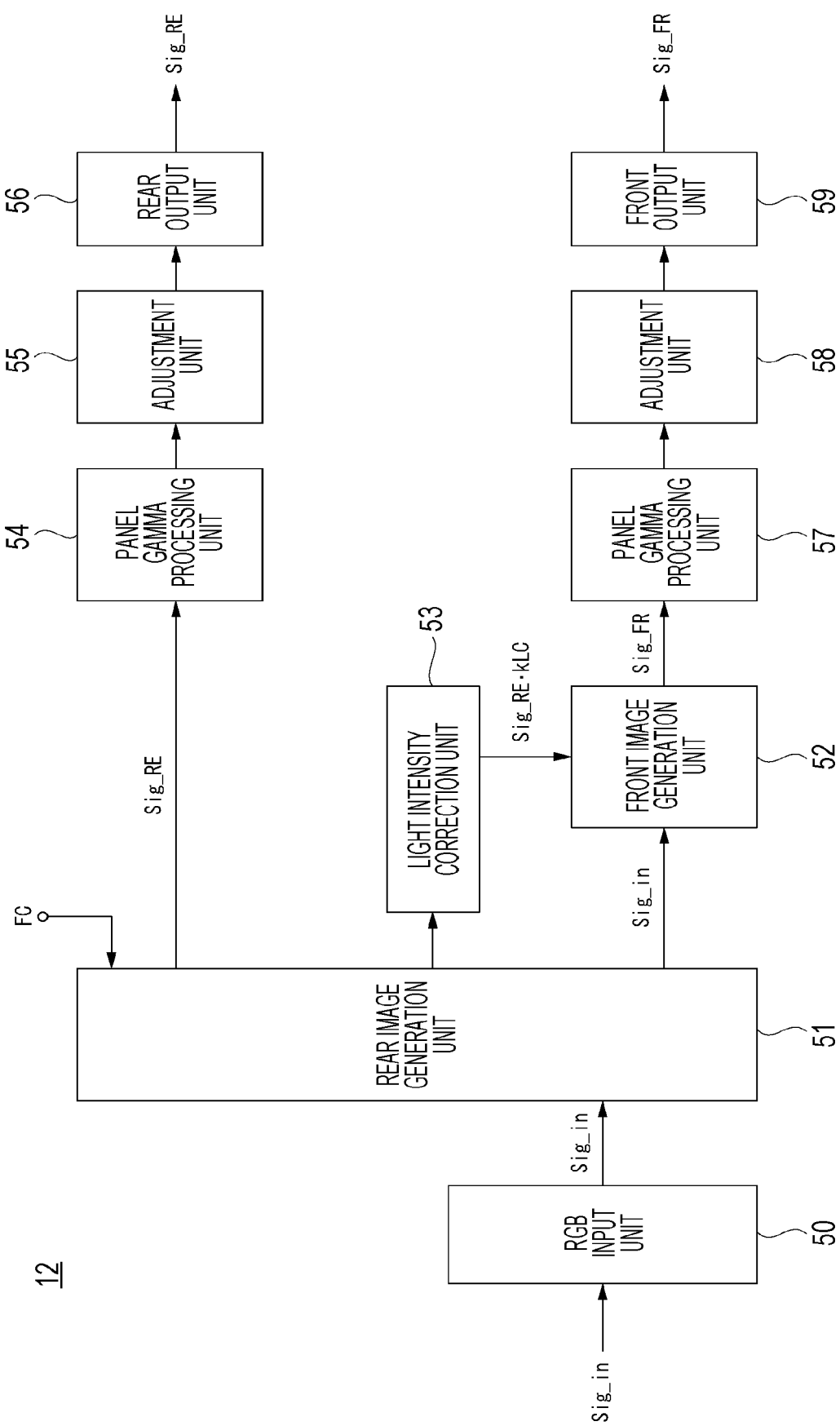
FIG. 4 is a block diagram of a dual cell image processing unit of the embodiment.
Figure 5:
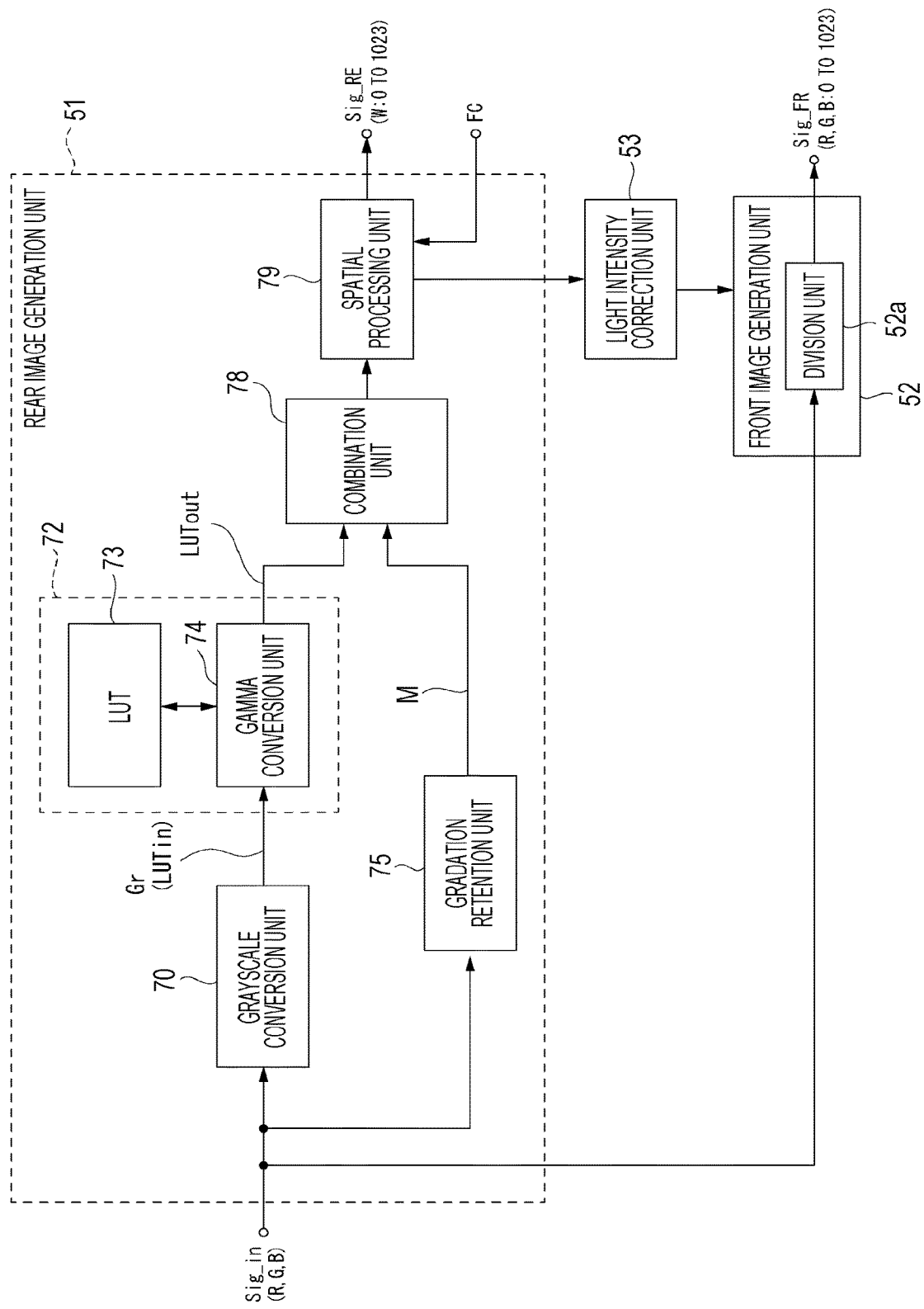
FIG. 5 is a block diagram of a main part of the dual cell image processing unit according to the embodiment.

FIG. 4 is a block diagram of the dual cell image processing unit 12, and FIG. 5 is a block diagram illustrating an inside of a rear image generation unit 51 in FIG. 4 in detail.

As illustrated in FIG. 4, the dual cell image processing unit 12 has an RGB input unit 50, the rear image generation unit 51, a front image generation unit 52, a light intensity correction unit 53, panel gamma processing units 54 and 57, adjustment units 55 and 58, a rear output unit 56, and a front output unit 59.

An image signal Sig_in from the display image processing unit 11 is input to the RGB input unit 50, and is supplied from the RGB input unit 50 to the rear image generation unit 51.

The image signal Sig_in is, for example, a signal having 1024 gradations by 10 bits for each of R, G, and B. Of course, having the 1024 gradations (10 bits) is only an example for explanation, and signals having a smaller or larger number of gradations (bit length) may be used.

The rear image generation unit 51 generates a rear image signal Sig_RE by a process as described later. The rear image signal Sig_RE is, for example, a W (white) signal having 1024 gradations (10 bits: 0 to 1023).

The rear image signal Sig_RE is subjected to a gamma process according to the rear liquid crystal cell 3 in the panel gamma processing unit 54, and then subjected to necessary adjustment processing in the adjustment unit 55. Then, it is subjected to delay adjustment processing, parallelization corresponding to the three sub-pixels 36, and the like in the rear output unit 56, and is supplied to the rear liquid crystal cell drive unit 30.

Note that in a case where the sub-pixels are not formed in the rear liquid crystal cell 3 as described above, the rear image signal Sig_RE is output in a manner corresponding to the front image signal Sig_FR at three timings corresponding to the three sub-pixels 26R, 26G, and 26B in the front liquid crystal cell 2.

The rear image signal Sig_RE generated by the rear image generation unit 51 is also supplied to the light intensity correction unit 53. The light intensity correction unit 53 multiplies the rear image signal Sig_RE by a light intensity correction coefficient kLC for correcting a light intensity component incident on the front liquid crystal cell 2, and outputs a signal to the front image generation unit 52.

The light intensity correction coefficient kLC is a fixed value, for example. However, the light intensity correction coefficient kLC may be a variable value. For example, the light intensity correction coefficient kLC may be adaptively calculated according to an image.

The image signal Sig_in is supplied to the front image generation unit 52. The front image generation unit 52 is provided with a division unit 52a as illustrated in FIG. 5, and generates the front image signal Sig_FR by dividing the input image signal Sig_in by the rear image signal Sig_RE.

In a case of the dual cell type liquid crystal display panel 1, an image in which an image in the rear liquid crystal cell 3 and an image in the front liquid crystal cell 2 are combined is visually recognized as a display image. That is, an image in which luminance of the rear liquid crystal cell 3 and luminance of the front liquid crystal cell 2 are multiplied is displayed. Therefore, regarding the front image signal Sig_FR, by dividing luminance thereof by the amount of the rear image signal Sig_RE, display according to luminance of the original image signal Sig_in can be performed for each pixel. For such reason, the front image signal Sig_FR is generated by dividing the image signal Sig_in by the rear image signal Sig_RE.

However, in reality, since a light intensity difference occurs from the emission from the rear liquid crystal cell 3 until the incidence on the front liquid crystal cell 2, to be accurate, it is necessary to make a correction rather than a simple division. Accordingly, the light intensity correction unit 53 corrects the rear image signal Sig_RE (Sig_RE·kLC).

Therefore, in the front image generation unit 52 (division unit 52a), the front image signal Sig_FR is calculated as $$\mathrm{Sig\_FR} = \mathrm{Sig\_in} / (\mathrm{Sig\_RE} \cdot kLC).$$

Here, the image signal Sig_in is a signal including gradation values Sig_in(R), Sig_in(G), and Sig_in(B) of R, G, and B, and thus more specifically, for the front image signal Sig_FR, as gradation values Sig_FR(R), Sig_FR(G), and Sig_FR (B) of R, G, and B thereof, the front image signal Sig_FR is generated as $$\mathrm{Sig\_FR}(R) = \mathrm{Sig\_in}(R) / (\mathrm{Sig\_RE} \cdot kLC),$$

$$\mathrm{Sig\_FR}(G) = \mathrm{Sig\_in}(G) / (\mathrm{Sig\_RE} \cdot kLC), \text{ and}$$

$$\mathrm{Sig\_FR}(B) = \mathrm{Sig\_in}(B) / (\mathrm{Sig\_RE} \cdot kLC).$$

Each of the gradation values Sig_FR(R), Sig_FR(G), and Sig_FR(B) of R, G, and B is, for example, 10-bit signals having 1024 gradations (0 to 1023).

Note that, for example, in a case where the liquid crystal display panel 1 has a structure in which the light intensity correction is less necessary, it is conceivable to set Sig_FR=Sig_in/Sig_RE without giving the light intensity correction coefficient kLC.

The front image signal Sig_FR generated by the front image generation unit 52 is subjected to a gamma process according to the front liquid crystal cell 2 in the panel gamma processing unit 57 illustrated in FIG. 4, and then subjected to necessary adjustment processing in the adjustment unit 58. Then, the front output unit 59 performs parallelization and the like corresponding to the three sub-pixels 26R, 26G, and 26B, and supplies the signals to the front liquid crystal cell drive unit 20.

A configuration in the rear image generation unit 51 will be described with reference to FIG. 5.

In the rear image generation unit 51, the image signal Sig_in that is an input color image signal is converted into a grayscale signal (monochrome image signal) Gr by a grayscale conversion unit 70.

The grayscale conversion is performed as follows using the coefficients kR, kG, and kB.

$$Gr = kR \cdot \mathrm{Sig\_in}(R) + kG \cdot \mathrm{Sig\_in}(G) + kB \cdot \mathrm{Sig\_in}(B)$$

That is, the coefficient kR for R, the coefficient kG for G, and the coefficient kB for B are multiplied corresponding to the respective gradation values Sig_in(R), Sig_in(G), and Sig_in(B) of R, G, and B included in the image signal Sig_in, and they are added to obtain a grayscale signal Gr. This grayscale signal Gr has a gradation value (0 to 1023) as W (white).

Such a grayscale signal Gr is supplied to a gradation conversion unit 72 and subjected to gradation value conversion.

The gradation conversion unit 72 includes a look up table (LUT) 73 and a gamma conversion unit 74. The gamma conversion unit 74 refers to the LUT 73 using the gradation value of the input grayscale signal Gr as an LUT input signal LUT in, and obtains a corresponding output gradation value (LUT output signal LUTout). Then, the output gradation value LUTout is supplied to a combination unit 78.

FIG. 6A illustrates an example of conversion characteristics in the gradation conversion unit 72. That is, a conversion curve is illustrated as an input gradation (horizontal axis)-output gradation (vertical axis) of the LUT 73.

Further, FIG. 6B represents light transmittance of the front liquid crystal cell 2 and the rear liquid crystal cell 3. In FIG. 6B, the horizontal axis illustrates the gradation level of a signal supplied to the front liquid crystal cell 2 and the rear liquid crystal cell 3, and the vertical axis represents transmittances L2 and L3. Here, the transmittance L2 indicates transmittance of the front liquid crystal cell 2, and the transmittance L3 indicates transmittance of the rear liquid crystal cell 3.

In the front liquid crystal cell 2, the transmittance L2 changes according to the gradation level in a range where the gradation level is higher than a certain level (for example, a level of about 40[° ]), but the transmittance L2 is almost constant in a range lower than that level. That is, the transmittance L2 of the front liquid crystal cell 2 does not decrease sufficiently in the low gradation range.

Accordingly, in the liquid crystal display panel 1, the transmittance L3 in the rear liquid crystal cell 3 is kept constant (100%) in a range where the gradation level is high, and the transmittance L3 in the rear liquid crystal cell 3 is changed according to the gradation level in the range described above, for example, where the gradation level is lower than about 40[° ].

Thus, in the liquid crystal display panel 1, a product Ltotal of the transmittance L2 in the front liquid crystal cell 2 and the transmittance L3 in the rear liquid crystal cell 3 can be changed according to the gradation level also in the range where the gradation level is low similarly to the range where the gradation level is high. Therefore, in the liquid crystal display panel 1, for example, the transmittance Ltotal can be lowered in the low gradation range as compared to a case of a configuration using one liquid crystal cell, and thus contrast can be enhanced.

The gradation conversion unit 72 performs gamma conversion so that this transmittance L3 illustrated in FIG. 6B can be achieved. The conversion characteristic in this case is as illustrated in FIG. 6A, for example. That is, the output gradation value is set to be the highest gradation value in the range where the input gradation value is higher than a certain gradation value. That is, the output gradation value is set to be the highest gradation value in the range where the input gradation value is higher than a certain gradation value.

As illustrated in FIG. 5, the rear image generation unit 51 is provided with a gradation retention unit 75 for gradation reproducibility at high gradation.

The gradation retention unit 75 detects the maximum value among the respective gradation values Sig_in(R), Sig_in(G), and Sig_in(B) of R, G, and B in the image signal Sig_in, and performs a predetermined process on the detected maximum value to generate a signal M. This signal M is supplied to the combination unit 78.

With respect to the image signal Sig_in at a certain point of time, the combination unit 78 is supplied with a gradation value as the signal M and a gradation value as the LUT output signal LUTout at the same timing, and selects and uses one with a larger gradation value thereof as a gradation value as the rear image signal Sig_RE.

The output (rear image signal Sig_RE) of the combination unit 78 is processed by a spatial processing unit 79 and then output from the rear image generation unit 51.

From this fact, roughly speaking, if the image signal Sig_in for a pixel in a high gradation range is input, the gradation value by the signal M is likely to be reflected in the rear image signal Sig_RE, or if the image signal Sig_in for a pixel in a low gradation range is input, the gradation value by the LUT output signal LUTout is likely to be reflected in the rear image signal Sig_RE. However, it cannot be generally stated thus because the output gradation value of the LUT 73 does not simply correspond to the gradation of the image signal Sig_in.

The signal M is used because, for example, in a case where a single-color signal of R with 1023 gradations is input, there is a possibility that the signal does not return to 1023 gradations by grayscale conversion or conversion by the LUT 73. This depends on the settings of the coefficients kR, kG, and kB and the LUT 73.

Assuming such a case, the signal M based on the maximum value may be used in some cases in order to maintain the gradations.

The spatial processing unit 79 performs a spatial filter process on an output of the combination unit 78, and outputs the output as a rear image signal Sig_RE.

For example, the spatial processing unit 79 performs a filter process using a finite impulse response (FIR) filter. This FIR filter functions as a low-pass filter and blurs an image displayed on the rear liquid crystal cell 3. Thus, in the display device 90, the possibility of an image defect or a double image to occur in a display image when an observer observes the display image can be reduced. The number of taps of the FIR filter is set according to the target value e of a viewing angle that does not cause an image defect or a double image in the display image.

Figure 7:
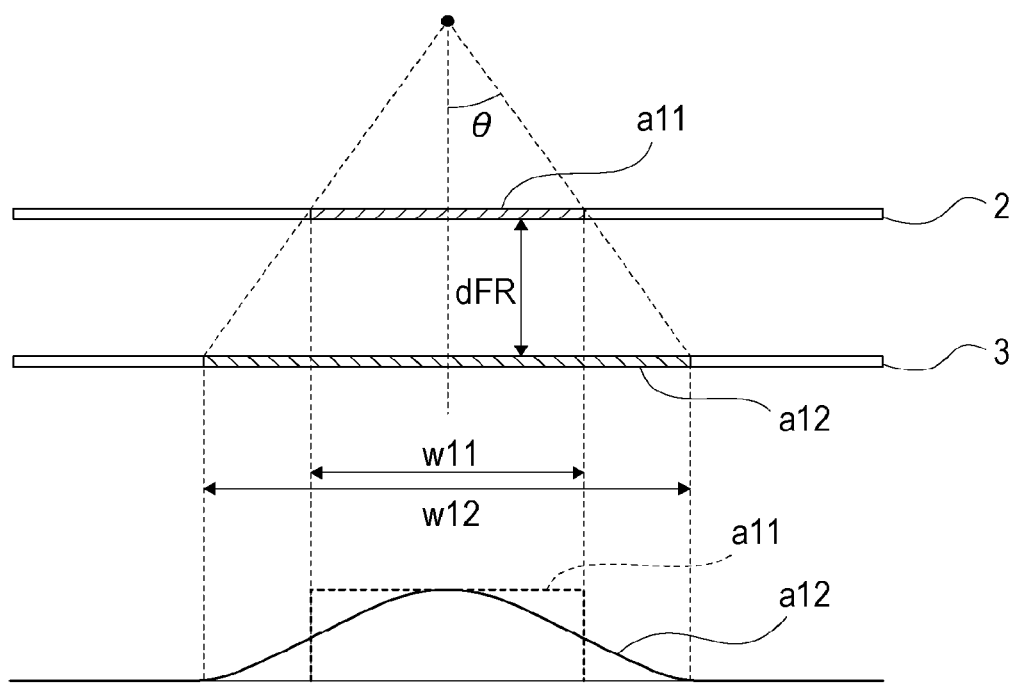
FIG. 7 is an explanatory diagram of a spatial filter process for blurring the rear liquid crystal cell side of the embodiment.
Figure 9:
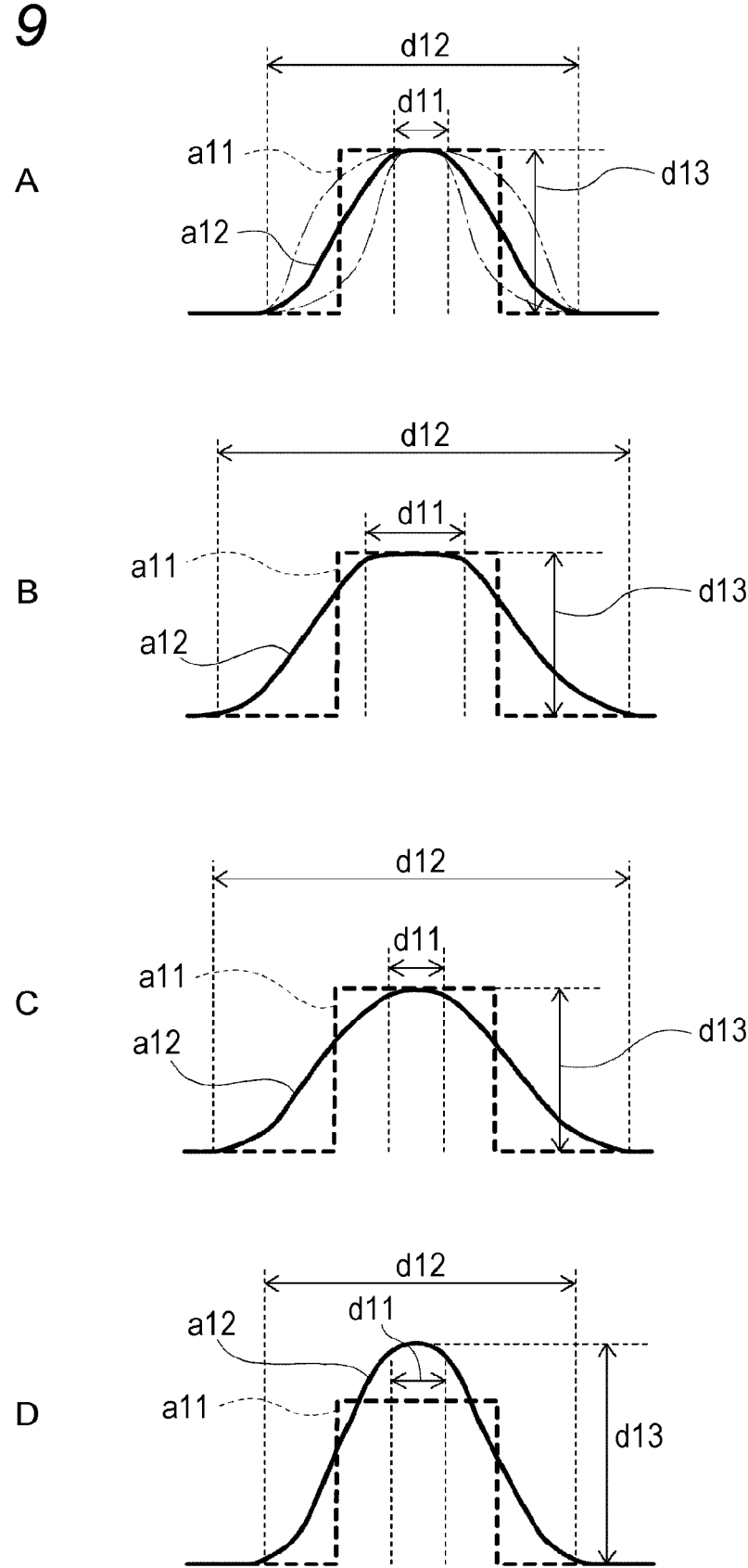
FIG. 9 is an explanatory diagram of control of filter characteristics of the embodiment.

FIG. 7 is for explaining a spatial filter process by the spatial processing unit 79, and illustrates a cross-sectional schematic diagram of the front liquid crystal cell 2 and the rear liquid crystal cell 3 together with gradations (luminance) in the respective liquid crystal cells 2 and 3.

In this example, the front liquid crystal cell 2 displays a display element a11, and the rear liquid crystal cell 3 displays a display element a12 at a position corresponding to the display position of the display element a11 in the front liquid crystal cell 2. Since the display element a12 is blurred by the spatial filter process, a width w12 of the display element a12 is larger than a width w11 of the display element a12.

The gradation of the display element a11 is constant with an original gradation value of the display element a11 within a transmission range as depicted by a dashed line. On the other hand, the gradation of the display element a11 has a mountainous distribution as depicted by a solid line. In the spatial filter process, a transmission pixel range in the rear liquid crystal cell 3 is made larger than that in the front liquid crystal cell 2, and moreover, the rear image signal Sig_RE is subjected to a process such that the image is blurred by a mountainous gradation change occurring as described above.

The effect of the spatial filter process on such a rear image signal Sig_RE will be described.

FIGS. 8A and 8B illustrate schematic cross-sectional views of the front liquid crystal cell 2 and the rear liquid crystal cell 3 and the gradation (luminance) in each of the liquid crystal cells 2 and 3, similarly to FIG. 7. FIG. 8A illustrates a case where the rear image signal Sig_RE is subjected to the spatial filter process, and FIG. 8B illustrates a case where it is not subjected to the spatial filter process.

In a case where the spatial filter process is not performed, the display element a13 displayed on the rear liquid crystal cell 3 has the same width as the display element a11 displayed on the front liquid crystal cell 2, and a change in luminance is steep, as illustrated in FIG. 8B.

When a user in the direction of an angle φ from a normal direction of the display plane observes such a display image, the display element a11 is observed in a range C11.

At this time, in the range C11, there occurs a portion where transmittance of light in the front liquid crystal cell 2 is high but transmittance of light in the rear liquid crystal cell 3 is low. Therefore, a part of the display element a11 may be visually recognized as being partially cut.

Further, in a range C13, the transmittance of light in the front liquid crystal cell 2 is low, but the transmittance of light in the rear liquid crystal cell 3 is high. Then, if the transmittance of the front liquid crystal cell 2 in this range C13 is not sufficiently low, it is possible that a double image occurs in the display image.

On the other hand, in the case of FIG. 8A, since the display element a12 displayed on the rear liquid crystal cell 3 is blurred by the spatial filter process, it has a large width and has luminance that changes gently, unlike the display element a11 displayed on the front liquid crystal cell 2.

When the user in the direction of the angle φ from the normal direction of the display plane observes the display element a11 in the range C11, the transmittance of light in the display element a11 is high, and the transmittance of light in the display element a12 changes gently. Thus, it is less likely that image defect will occur.

Further, in a range C12, the transmittance of light in the front liquid crystal cell 2 is low, and the transmittance of light in the rear liquid crystal cell 3 changes gently. Therefore, in the display device 1, the possibility of a double image to occur in the display image can be reduced. Consequently, the display device 90 can be improved in image quality.

3. Spatial Filter Control in Embodiment

In the present embodiment, the spatial filter process in the spatial processing unit 79 is controlled by the filter control unit 15.

For example, FIGS. 9A, 9B, 9C, and 9D illustrate examples of changing the filter characteristic of the spatial filter process in the spatial processing unit 79.

Control of the filter characteristic mentioned here is particularly of a filter characteristic for obtaining the gradation distribution illustrated in FIG. 7 or 8A. That is, changing the filter characteristic and changing the shape of a filter passing waveform for the rear image signal Sig_RE mean that the shape of how the gradation value thereof spreads is made variable when the spatial filter process on the rear image signal is performed so that the range of transmission pixels of the rear liquid crystal cell 3 is larger than the range of transmission pixels of the front liquid crystal cell 2.

For the sake of explanation, the shape of a passing waveform of a signal according to the filter characteristic set by the filter coefficient, that is, the shape of a gradation distribution illustrated as in FIGS. 9A, 9B, 9C, and 9D will be referred to as "filter shape".

The filter control unit 15 variably sets a parameter for setting a filter shape to the spatial processing unit 79 by the control signal FC.

Here, a peak width d11, a filter passage width d12, and a peak value d13 are illustrated as parameters. The filter shape is made variable by at least one or a combination of these three parameters.

The peak width d11 is the width of a range in which the level of the rear image signal Sig_RE that becomes gentle by the spatial filter process is substantially equal to the original gradation value (peak value) of the corresponding pixel.

The filter passage width d12 is the width of a range of the rear image signal Sig_RE that becomes gentle in the spatial filter process (the width including a foot portion of the signal by a low pass process). That is, this range corresponds to the range (blurred range) of the transmission pixels of the rear liquid crystal cell 3 in a case where the range of the transmission pixels of the rear liquid crystal cell 3 is made larger than the range of the transmission pixels of the front liquid crystal cell 2.

The peak value d13 is a gradation value that becomes a peak of the corresponding pixel of the rear image signal Sig_RE that becomes gentle by the spatial filter process.

Note that the filter characteristics of FIGS. 9A, 9B, 9C, and 9D are examples, and the waveform shape as the filter characteristics is not uniquely determined by the peak width d11, the filter passage width d12, and the peak value d13, and various filter characteristics are assumed. For example, even if the peak width d11, the filter passage width d12, and the peak value d13 are the same as those in FIG. 9A, it is not limited to the filter characteristics of solid lines as the filter characteristics, and examples illustrated by one-dot chain lines and two-dot chain lines are also conceivable.

Here, the necessity of performing such variable control of the filter shape and the concept of the variable control of the embodiment will be described.

In the embodiment, the filter shape for blurring the image of the rear liquid crystal cell 3 is variably controlled according to the surrounding environment illuminance, thereby improving image quality by reducing image defect and flare (black float).

It is generally known that the luminosity of human eyes and the range of recognizable brightness and darkness (dynamic range) change depending on the surrounding environment illuminance (total intensity of light entering the eye). That is, when the surrounding environment becomes bright, the range of brightness and darkness that can be recognized by the iris (aperture) of the eye shifts to a brighter direction.

Figure 10:
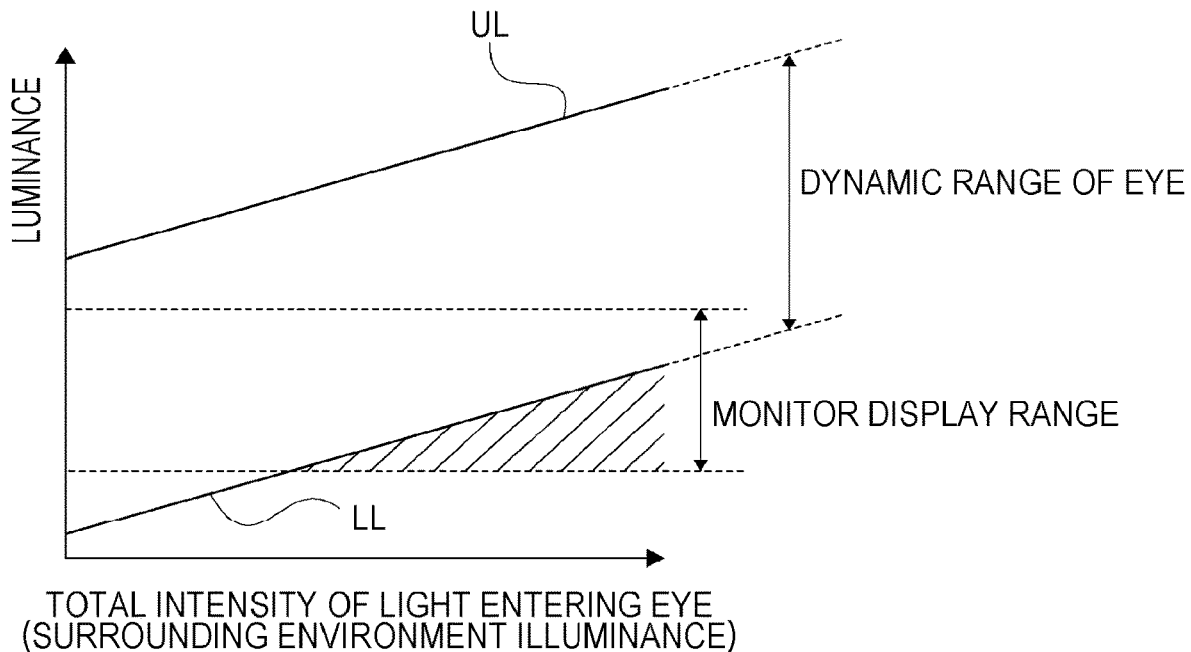
FIG. 10 is an explanatory diagram of changes in light receiving sensitivity of human eyes.

In FIG. 10, the horizontal axis illustrates the total intensity of light entering the human eye (surrounding environment illuminance), and the vertical axis represents the luminance, illustrating changes in the light receiving sensitivity depending on the iris (aperture) of the eye.

First, the luminance range of the image displayed by the liquid crystal display panel 1 is constant regardless of the surrounding environment illuminance, as indicated by a monitor display range.

On the other hand, the dynamic range of the human eye changes depending on the surrounding environment illuminance, as illustrated by the range of a line UL on high luminance side (upper limit value of luminosity) and a line LL on low luminance side (lower limit value of luminosity).

For this reason, when the surrounding environment illuminance increases, the apparent luminance of the liquid crystal display panel 1 having a constant luminance is felt to have become relatively dark. Since humans cannot recognize the gradation of the luminance below the line LL on the low luminance side, when the surrounding environment illuminance is high, the luminance of a low gradation part of the liquid crystal display panel 1, that is, the luminance of a shaded part in the diagram can no longer be identified (all the gradations in the shaded part appear to be of the same black).

On the basis of this, an image that has undergone the spatial filter process will be considered.

Figure 11:
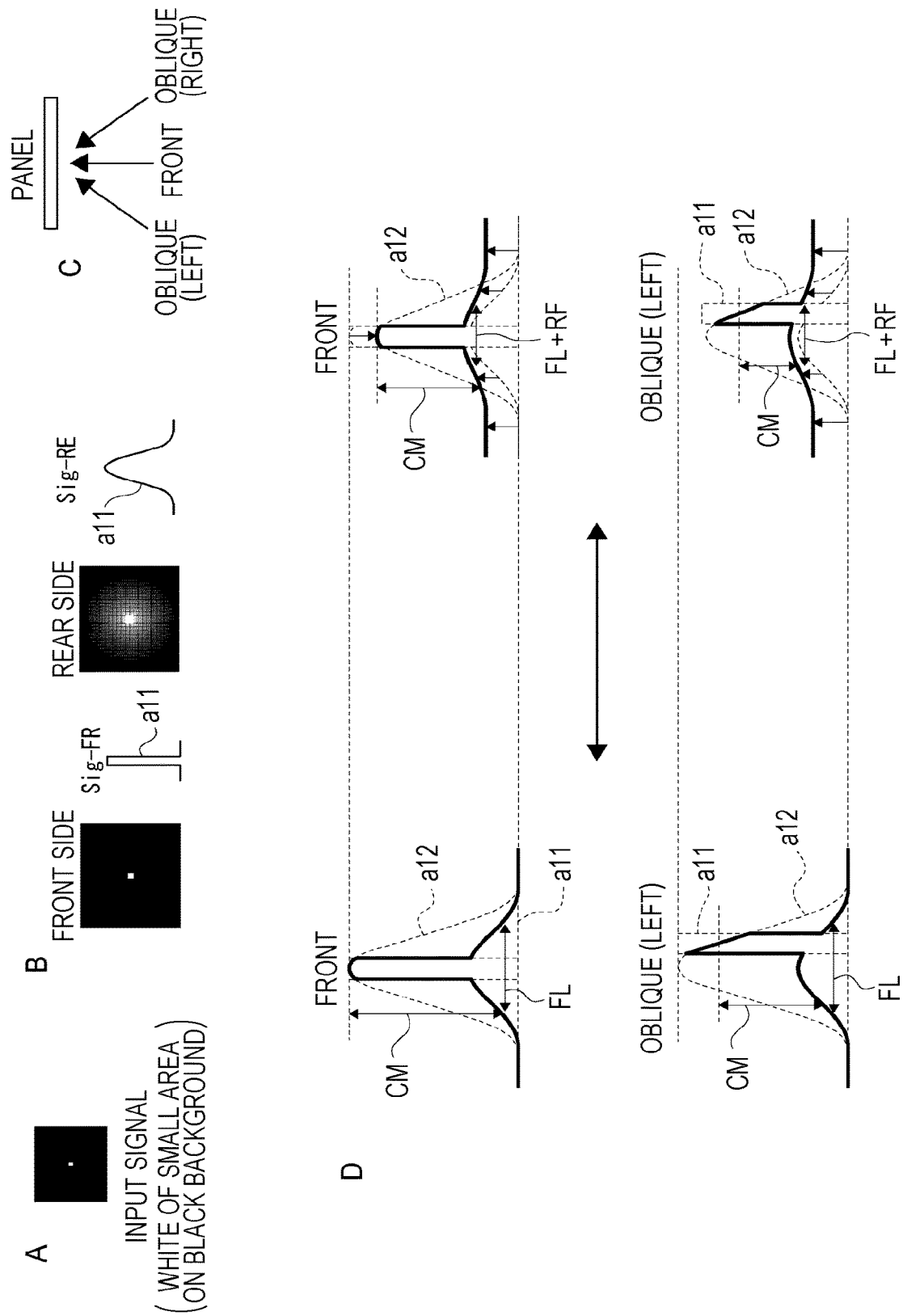
FIG. 11 is an explanatory diagram of changes in appearance depending on surrounding illuminance.

FIG. 11 illustrates an appearance of the displayed image depending on the surrounding environment illuminance.

It is assumed that a white image with a small area is displayed on a black background as illustrated in FIG. 11A. In this case, the rear liquid crystal cell 3 side is blurred by the spatial filter process.

FIG. 11B illustrates an image on the front liquid crystal cell 2 side and the front image signal Sig_FR (display element a11), and an image on the rear liquid crystal cell 3 side and the rear image signal Sig_RE (display element a12) in this case. In this manner, an image is blurred and widened by image processing of the rear liquid crystal cell 3 so that the image defect does not occur even in oblique view when the front liquid crystal cell 2 and the rear liquid crystal cell 3 are viewed in an overlapping manner.

FIG. 11D illustrates a difference in appearance of the liquid crystal display panel 1 driven for display in this manner depending on the surrounding environment illuminance, including visual recognition from the front and oblique directions as illustrated in FIG. 11C. In FIG. 11D, an appearance to a viewer when viewing from the front and when viewing from oblique left is indicated by a thick line in a case where the surrounding light is dark and in a case where it is bright. Note that dashed lines are waveforms of the display elements a11 and a12 illustrated in FIG. 11B.

In the case where the surroundings are dark, the transmitted light in a blurred portion of the rear image is recognized as a flare FL (black float) through the front liquid crystal cell 2 in both the front view and the oblique view.

Thus, apparent contrast CM is lowered, and it becomes easily perceivable as image quality deterioration.

In the case where the surroundings are bright, the appearance of the entire display looks dark due to the shift of the luminosity range described in FIG. 10, and it becomes difficult to identify the low gradation side. For this reason, the flare FL is hard to see, but this time the white image portion looks dark, particularly when viewed from an angle. In addition, low gradation is raised due to the influence of external light reflection RF. Thus, it becomes easy for the viewer to perceive an image defect and a deterioration of the apparent contrast CM.

Figure 12:
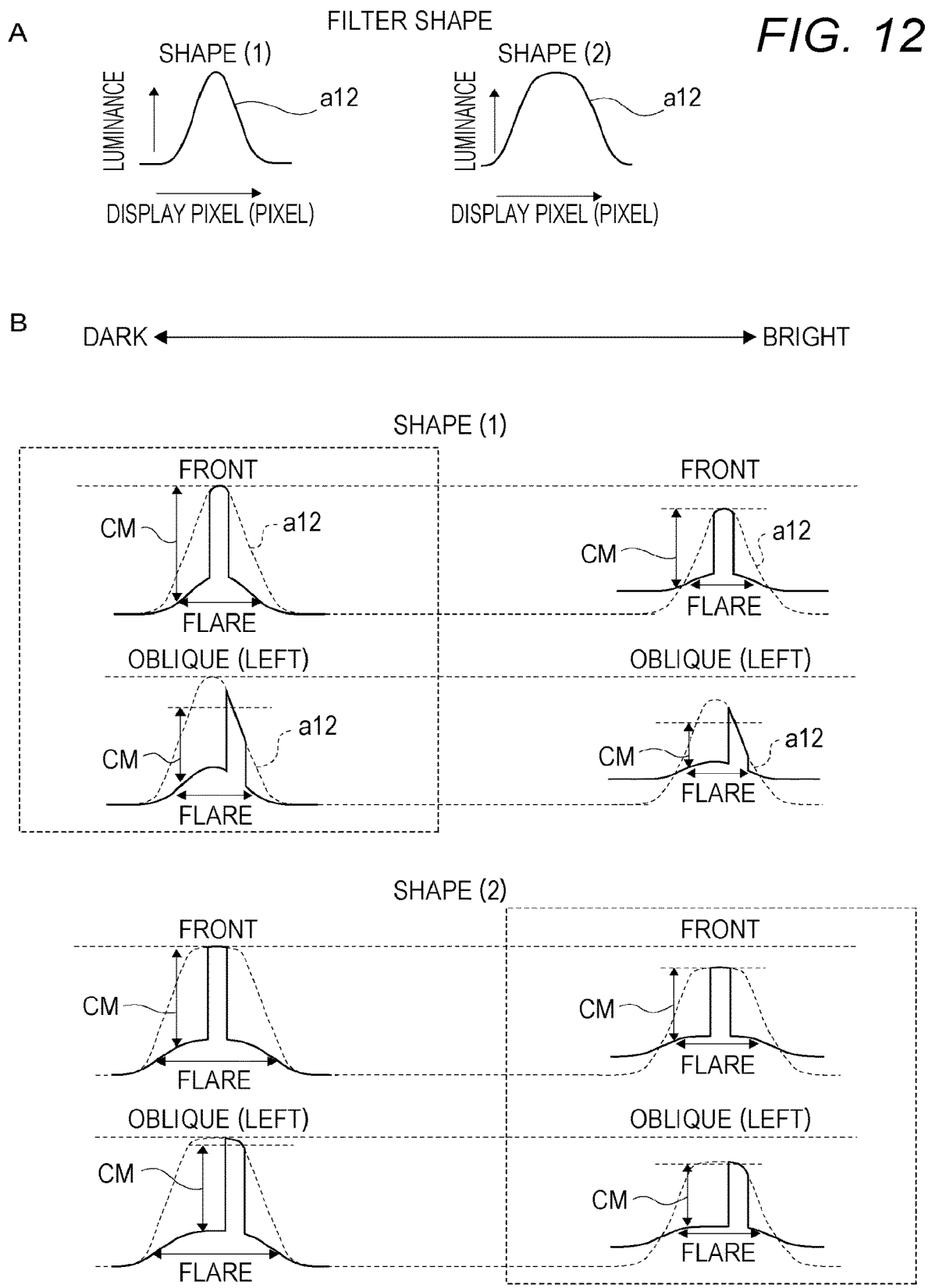
FIG. 12 is an explanatory diagram of an appearance depending on surrounding illuminance and a spatial filter characteristic.

Filter shape control is effective for such an event. FIG. 12 illustrates an appearance depending on the surrounding environment illuminance and the filter shape of the spatial filter process on the rear image signal Sig_RE.

FIG. 12A illustrates two types of filter shapes as shape (1) and shape (2). In FIG. 12B, cases where the shapes (1) and (2) are used as the filter shape are illustrated similarly to previous FIG. 11D for respective cases of a front view and an oblique view.

In the case of shape (1), that is, the amount of blurring of the rear image (the amount of transmitted light) is small, the flare FL is inconspicuous and good when the surroundings are dark. Specifically, this is because the amount of transmitted light in the blurred portion of the rear image is reduced.

However, when the surroundings are bright, the apparent contrast CM may be reduced or an image defect may appear to have occurred, particularly when viewed from an angle. This is because the effect of blurring the rear image described in FIG. 8A diminishes.

In the case of shape (2), that is, the amount of blurring of the rear image (the amount of transmitted light) is increased, the range of the flare FL becomes large when the surroundings are dark, and thus the image quality is likely to deteriorate. This is because the amount of transmitted light in the blurred portion of the rear image increases.

On the other hand, when the surroundings are bright, the flare FL is not noticeable to the viewer due to the relationship of luminosity described in FIG. 10, and the transmitted light range widens in the oblique view, so that the contrast CM is improved and the image defect is unlikely to occur.

From the above, the blurring amount of rear image processing that is appropriate for the surrounding environment illuminance is different, and for example, as surrounded by a dashed line in FIG. 12B, the shape (1) (small blurring amount) is preferable when the surroundings are dark, and the shape (2) (large blurring amount) is preferable when the surroundings are bright.

That is, by controlling the filter shape in the spatial filter process for the rear image signal Sig_RE, it is possible to reduce the image quality deterioration according to the surrounding environment illuminance and allow the viewer to perceive the image quality improvement.

Therefore, in the present embodiment, the filter control unit 15 variably controls the filter shape according to the detection value of the illuminance sensor 40.

FIG. 13 illustrates an example of filter control. FIG. 13A illustrates an input signal as a one-dot image. The front image signal Sig_FR (display element a11) in this case is illustrated in FIG. 13B. FIG. 13C illustrates the rear image signal Sig_RE (display element a12) in a state of being overlapped on the display element a11 of dashed lines.

In the spatial filter process, the peak width d11, the filter passage width d12, and the peak value d13 are used as parameters of the filter process.

For example, the spatial processing unit 79 sets a filter coefficient with these three parameters being specified, and performs the spatial filter process of the specified filter characteristic.

The filter control unit 15 is provided with table data in which, for example, the peak width d11, the filter passage width d12, and the peak value d13 according to the value of the surrounding environment illuminance are stored. Then, the filter control unit 15 sequentially monitors the detection value of the illuminance sensor 40, reads the peak width d11 or the like corresponding to the detection value from the table, and supplies this peak width as the control signal FC to the spatial processing unit 79.

Of course, the filter control unit 15 may calculate the parameters such as the peak width d11 by a predetermined calculation process using the detection value of the illuminance sensor 40 instead of the table.

FIG. 13D illustrates an example in which the peak width d11 and the filter passage width d12 are changed according to the surrounding environment illuminance. In this case, for example, the table described above is only required to store values of the peak width d11 and the filter passage width d12 according to respective values of the surrounding environment illuminance.

By this control, the filter shape is controlled so that as the surrounding area becomes darker, the peak width d11 and the filter passage width d12 become smaller (the blurring amount becomes smaller), and as the surrounding area becomes brighter, the peak width d11 and the filter passage width d12 become larger (the blurring amount becomes larger).

That is, as described in FIG. 12B, the filter control is performed so as to reduce the image quality deterioration according to the surrounding environment illuminance.

Various other examples of controlling the filter shape can be considered. FIG. 14 illustrates them in a similar format to FIG. 13D.

FIG. 14A is an example in which the peak width d11 and the peak value d13 are variably controlled according to the surrounding environment illuminance.

FIG. 14B is an example in which the filter passage width d12 and the peak value d13 are variably controlled according to the surrounding environment illuminance.

FIG. 14C is an example in which only the peak width d11 is variably controlled according to the surrounding environment illuminance.

FIG. 14D is an example in which only the filter passage width d12 is variably controlled according to the surrounding environment illuminance.

FIG. 14E is an example in which only the peak value d13 is variably controlled according to the surrounding environment illuminance.

FIG. 14F is an example in which the peak width d11, the filter passage width d12, and the peak value d13 are variably controlled according to the surrounding environment illuminance.

In each of the above cases, in a case where the peak width d11 is variably controlled, it is controlled so that the darker it is, the narrower the width, and the brighter it is, the wider the width.

In a case where the filter passage width d12 is variably controlled, it is controlled so that the darker it is, the narrower the width, and the brighter it is, the wider the width.

In a case where the peak value d13 is variably controlled, it is controlled so that the darker it is, the lower the peak value, and the brighter it is, the higher the peak value.

4. Process of First Embodiment

Processing of a first embodiment will be described with reference to FIG. 15 as a specific processing example of the filter control unit 15.

Figure 15:
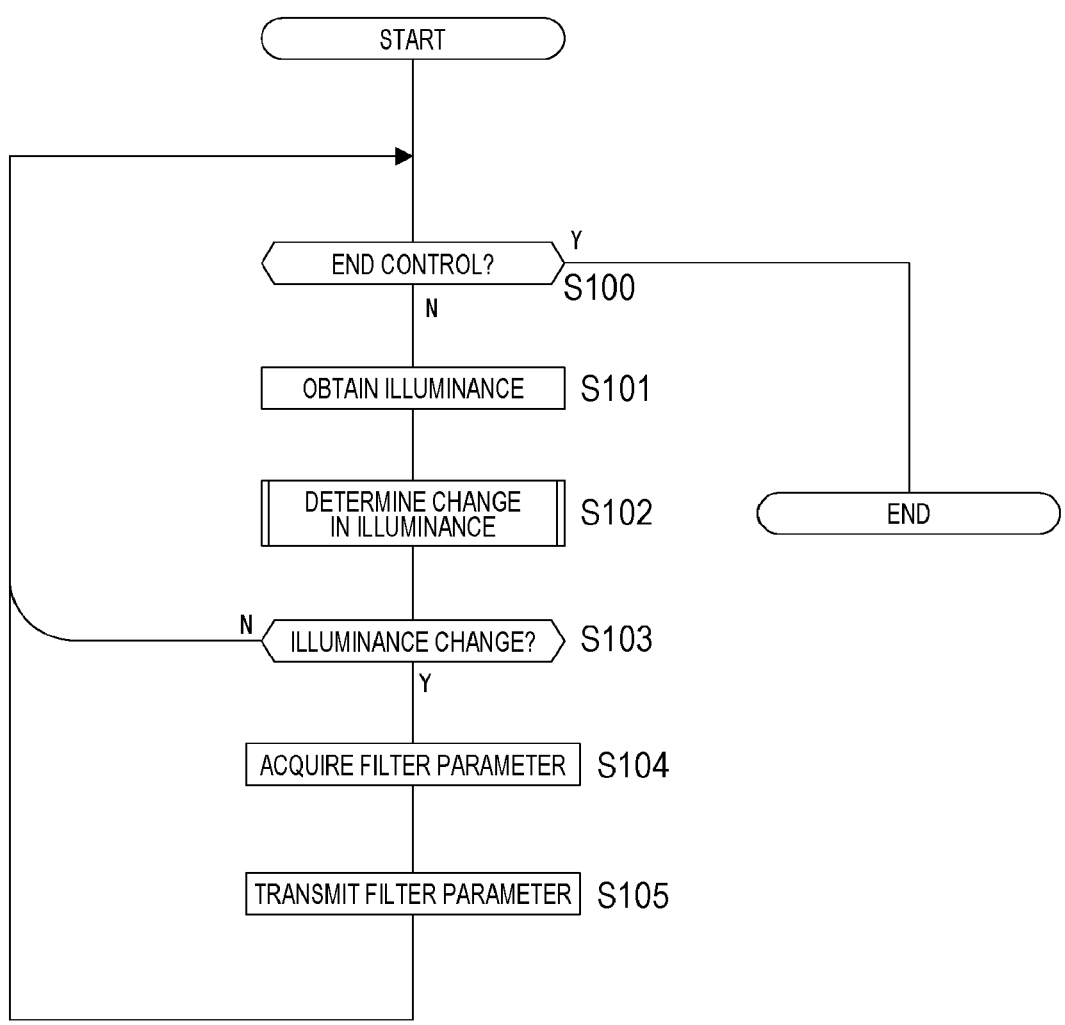
FIG. 15 is a flowchart of a filter control process of a first embodiment.

For example, the filter control unit 15 continuously performs the processing of FIG. 15 while the liquid crystal display panel 1 is displaying an image. For example, the filter control unit 15 starts the processing of FIG. 15 in response to start of image display on the liquid crystal display panel 1, and ends control from step S100 when the image display on the liquid crystal display panel 1 is turned off.

During the control, the filter control unit 15 acquires the detection value of the illuminance sensor 40 in step S101, and determines in step S102 whether or not an illuminance change has occurred. In this case, a slight change in the detection value is ignored, and it is determined whether or not a significant illuminance change has occurred enough to change the parameters of the spatial filter process. Details will be described later.

If no significant illuminance change has occurred, the filter control unit 15 returns from step S103 to steps S100 and S101 to continue monitoring the detection value of the illuminance sensor 40.

If a significant illuminance change has been detected, the filter control unit 15 proceeds from step S103 to S104 and acquires the filter parameter. That is, the table is referred to with the value of the currently detected illuminance, and a part or all of the peak width d11, the filter passage width d12, and the peak value d13 corresponding to the current illuminance are acquired.

Then, in step S105, the filter control unit 15 supplies the acquired parameters to the spatial processing unit 79 in the rear image generation unit 51. The spatial processing unit 79 changes the filter parameter accordingly. That is, the filter shape of the spatial filter process is changed and controlled.

As described above, the spatial filter process is sequentially controlled by the current illuminance, so that it is possible to reduce occurrence of image quality deterioration due to the surrounding light intensity.

5. Process of Second Embodiment

Processing of a second embodiment as processing of the filter control unit 15 will be described with reference to FIG. 16.

This is an example in which rapid filter shape change is not performed.

Depending on response characteristics of the front liquid crystal cell 2 and the rear liquid crystal cell 3, screen flicker may occur when the filter shape is changed. Accordingly, a hysteresis characteristic or a time filter is provided so as not to follow an illuminance change in a short time or an illuminance change having a small change amount.

Steps S100, S101, and S102 are similar to those in FIG. 15.

If it is determined that there has been a significant illuminance change, the filter control unit 15 proceeds from step S103 to S104.

Here, a processing example of step S102 for detecting a significant illuminance change will be described with reference to FIG. 17. Note that the processing of FIG. 17 can also be applied to step S102 of previous FIG. 15.

Figure 17:
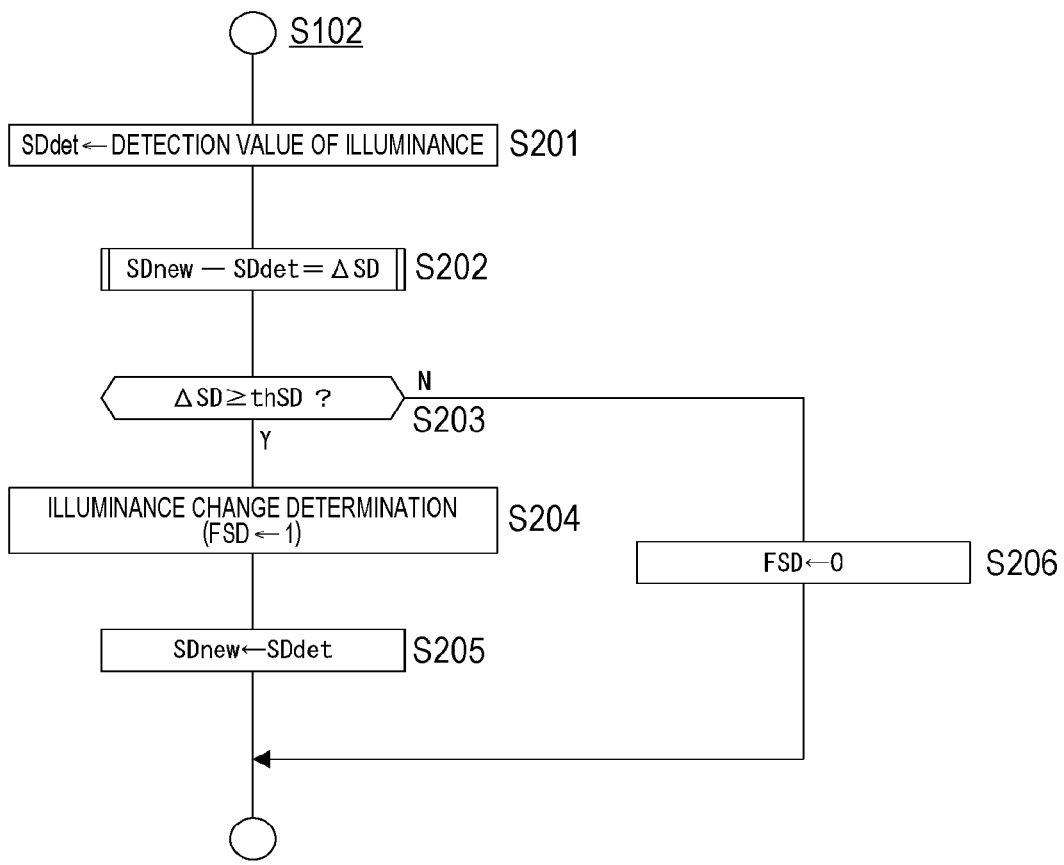
FIG. 17 is a flowchart of illuminance change determination according to the second embodiment.

As step S201 in FIG. 17, the filter control unit 15 substitutes a detection value of the current illuminance into a variable SDdet.

In step S202, the filter control unit 15 subtracts the variable SDdet from a variable SDnew to obtain a change amount ΔSD.

The variable SDnew is a detection value of the illuminance when the previous filter control is performed (that is, when it is determined last time that there has been a significant illuminance change), and is a value substituted in step S205 at that time.

Therefore, the change amount ΔSD indicates a change amount from an illuminance value when the previous significant illuminance change has occurred, with respect to the current illuminance value.

In step S203, the filter control unit 15 compares the change amount ΔSD with the threshold value thSD.

If ΔSD≥thSD is not satisfied, that is, if there is a slight illuminance change compared with a time of previous control, it is determined that there is no significant illuminance change, a flag FSD=0 is set in step S206, and the process of step S102 ends. The flag FSD is a flag indicating whether or not there is a significant illuminance change.

On the other hand, if Asp thSD is satisfied, the filter control unit 15 determines that there is a significant illuminance change as compared with the time of the previous control, that is, an illuminance change for which the filter shape has to be changed, and the flag FSD=1 is set in step S204.

Then, in step S205, the filter control unit 15 substitutes the value of the variable SDdet into the variable SDnew. This is a process in which the current illuminance value is set to the latest illuminance value for performing the filter shape control, and can be used in the next step S202.

By performing the processing as illustrated in FIG. 17 above, when there is an illuminance change that is equal to or larger than the threshold value thSD, it will be determined as a significant illuminance change, and it is possible to prevent excessive reaction to a slight illuminance change.

Figure 16:
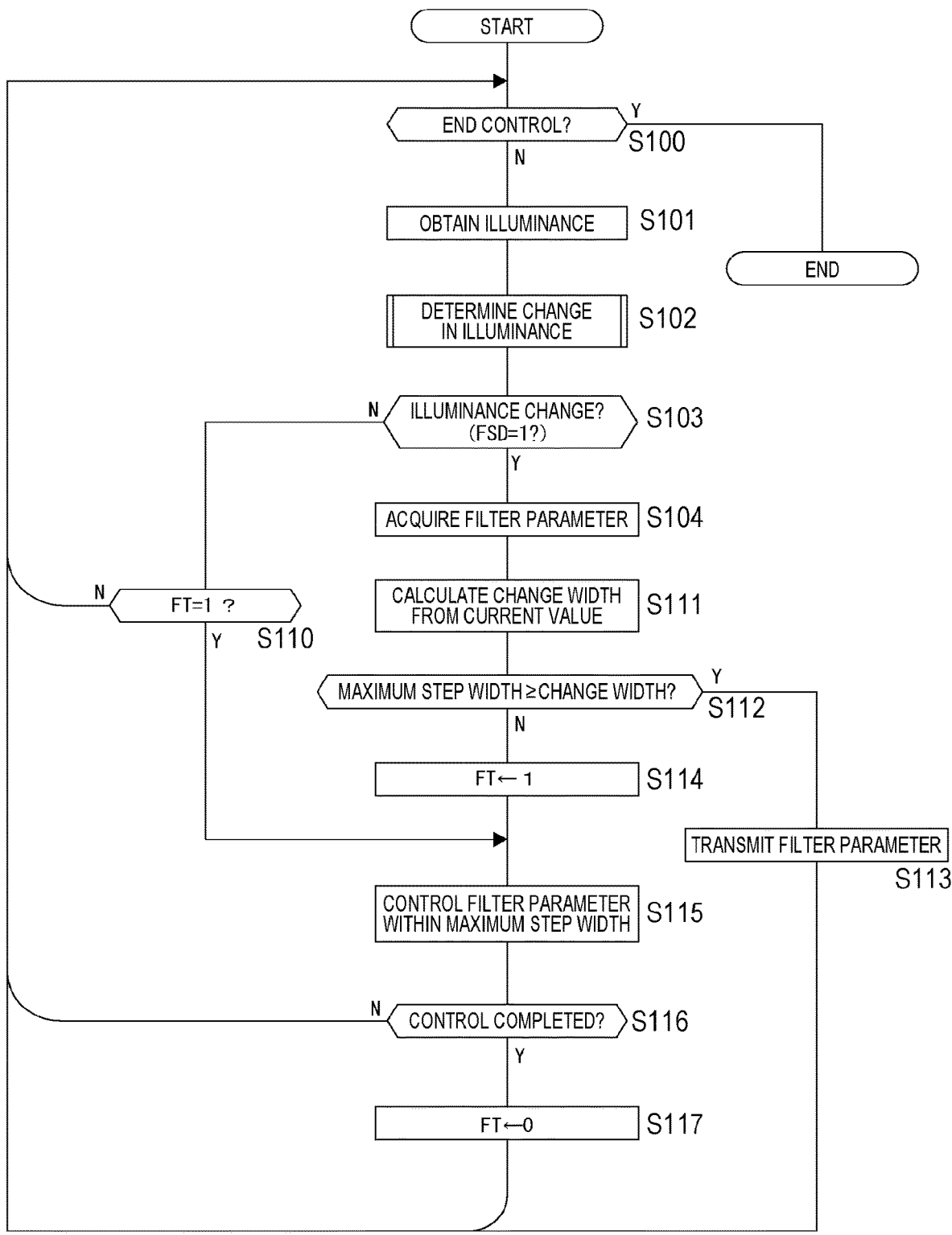
FIG. 16 is a flowchart of a filter control process of a second embodiment.

When the process of FIG. 17 is performed, it is only required to check the flag FSD in step S103 of FIG. 16. That is, if the flag FSD=1, it is determined that the illuminance change has been detected, and the process proceeds to step S104.

If the flag FSD=0, the filter control unit 15 determines that there has been no illuminance change and returns to S100 via step S110.

Note that although a flag FT is checked in step S110, the flag FT is a flag indicating that stepwise variable control is being performed. Normally, the flag FT=0, and the process returns to step S100.

When the process proceeds to step S104 due to the detection of the significant illuminance change, the filter control unit 15 acquires the filter parameter. That is, the table is referred to with the value of the currently detected illuminance (value of the variable SDnew), and the parameter corresponding to the current illuminance is acquired. Here, an example of controlling the filter passage width d12 as illustrated in FIG. 14D for example will be described.

In step S111, the filter control unit 15 compares the filter passage width d12 currently being controlled with the filter passage width d12 acquired according to the new illuminance value, and obtains a change width thereof.

Then, in step S112, the filter control unit 15 compares the change width with a preset maximum step width. The maximum step width is the maximum change amount in one time of control. This maximum step width is set to a change amount that does not cause a rapid parameter variation.

If the current change width is within the maximum step width from a current control value, there is no problem in changing the current parameter (new filter passage width d12) with one time of control.

Accordingly, in that case, the filter control unit 15 proceeds to step S113, and supplies the parameter (filter passage width d12) acquired according to the detection value of the current illuminance to the spatial processing unit 79 in the rear image generation unit 51. The spatial processing unit 79 changes the filter parameter accordingly. That is, the filter shape of the spatial filter process is changed and controlled.

On the other hand, if the current change width exceeds the maximum step width, stepwise variable control is performed. Thus, the filter control unit 15 in step S114 sets the flag FT=1 that indicates that the stepwise variable control is being performed, and supplies in step S115 the parameter changed within the maximum step width to the spatial processing unit 79. The spatial processing unit 79 changes the filter parameter accordingly. However, by only once, the filter shape corresponding to the current illuminance has not been reached.

Accordingly, during the period in which the parameter value (filter passage width d12) according to the current illuminance has not been reached, the process returns from step S116 to step S100 with the flag FT=1.

In this case, if no significant illuminance change is detected during the stepwise variable control, the process proceeds to steps S103→S110→S115, and the parameter changed within the maximum step width is transmitted to the spatial processing unit 79 again.

By repeating this, the filter shape is gradually changed by a plurality of times of the control within the maximum step width until the target parameter is reached.

When the control is completed to reach the target parameter (filter passage width d12), the flag FT=0 is set in step S117, and the process returns to step S100.

Note that although the illuminance value is monitored during the stepwise variable control, if it is determined that an illuminance change has occurred, the processing from step S104 is performed according to the new illuminance. In this case, the range of change in step S111 is a difference from the parameter value during the stepwise control.

Although the example in which the filter passage width d12 is gradually changed has been described above, similar processing may be performed when changing the peak width d11 and the peak value d13.

Further, in a case where a plurality of parameters is changed, it is only required to perform the variable control stepwise for a parameter that exceeds the maximum step width for each parameter.

In this manner, it is possible to achieve a process in which a filter is processed in the time direction regarding the parameter change. Of course, other processing examples are possible.

6. Summary and Modification Example

In the above embodiments, the following effects can be obtained.

The image processing device 10 according to the embodiment includes an image processing unit (dual cell image processing unit 12) that generates, as an image signal for a liquid crystal display panel 1 in which a display image is generated by light passing through a rear liquid crystal cell 3 and a front liquid crystal cell 2, a rear image signal Sig_RE and a front image signal Sig_FR, and a filter control unit 15 that controls a spatial filter process performed on the rear image signal Sig_RE in the dual cell image processing unit 12 on the basis of a detection value of an illuminance sensor 40 that detects illuminance around the display panel.

By a change in appearance to the user depending on the illuminance around the display device 90, an image defect may be more easily seen due to the illuminance (brightness and darkness) or the influence of flare may increase, but in a case of the present embodiment, the spatial filter process corresponding to the illuminance can be performed by performing spatial filter control of the rear image signal Sig_RE according to the surrounding environment illuminance.

Specifically, it becomes possible to make the flare inconspicuous in a dark state, and to improve an image defect and apparent contrast deterioration when visually recognizing from an oblique direction in a bright state, for example.

In the dual cell image processing unit 12 of the embodiment, the spatial processing unit 79 performs on the rear image signal Sig_RE the spatial filter process to make a transmission pixel range of an image in the rear liquid crystal cell 3 larger than that of an image in the front liquid crystal cell 2. That is, the spatial filter process is performed so as to blur the rear image. Specifically, a process like a low-pass filter for the rear image signal Sig_RE is performed so that the range of transmission pixels of the rear liquid crystal cell 3 by the rear image signal Sig_RE is wider than the range of transmission pixels of the front liquid crystal cell by the front image signal Sig_FR.

In this manner, for example, a double image is less likely to occur in the display image and the viewing angle can be improved, but control according to the illuminance is performed with respect to this spatial filter. This makes it possible to deal with a flare in a dark state, an image defect in a bright state, and contrast deterioration in a case of preventing the double image and improving the viewing angle.

In the embodiment, the filter control unit 15 variably controls a parameter that changes a filter characteristic in the spatial filter process on the basis of a detection value of the illuminance sensor 40.

That is, when the spatial filter process is performed on the rear image signal to make the range of transmission pixels of the rear liquid crystal cell by the rear image signal larger than the range of transmission pixels of the front liquid crystal cell, the filter characteristic thereof is made variable and the shape of a passing waveform of the rear image signal (the shape of how the gradation value spreads) is made variable. By variably controlling the shape of how the gradation value of the filter characteristic spreads, it is possible to achieve a suitable measure against a flare in a dark state, an image defect in a bright state, and contrast deterioration.

In the embodiment, the filter passage width d12 is mentioned as a parameter for changing the filter characteristic. The filter passage width is the width of a range of the rear image signal that becomes gentle in the spatial filter process (the width including a foot portion of the signal by a low pass process), and corresponds to the range of the transmission pixels (blurring range). The filter passage width is made variable according to the illuminance.

By variably controlling the filter passage width d12 (FIG. 14D), it is possible to correspond to deterioration of the image according to brightness and darkness (a flare in a dark state, an image defect in the bright state, and contrast deterioration).

In the embodiment, the peak width d11 is mentioned as a parameter for changing the filter characteristic.

The peak width is the width of a range in which the rear image signal that becomes gentle by the spatial filter process is equal to the original gradation value (peak value) of the corresponding pixel. This peak width is made variable according to the illuminance.

By the variable control of the peak width d11 (FIG. 14C), it is possible to deal with deterioration of the image depending on brightness and darkness.

Note that both the peak width d11 and the filter passage width d12 may be variably controlled (FIG. 13D). This also makes it possible to deal with deterioration of the image depending on brightness and darkness.

In the embodiment, the peak value d13 is mentioned as a parameter for changing the filter characteristic. The peak value is the gradation value of a peak of the rear image signal which becomes gentle by the spatial filter process, and this peak value is made variable according to the illuminance.

By variable control of the peak value d13 (FIG. 14E), it is possible to adjust the transmitted amount of light depending on brightness and darkness to correspond to deterioration of the image depending on brightness and darkness.

Note that both the peak value d13 and the filter passage width d12 may be variably controlled (FIG. 14B).

Further, both the peak value d13 and the peak width d11 may be variably controlled (FIG. 14A).

Furthermore, all of the peak value d13, the filter passage width d12, and the peak width d11 may be variably controlled (FIG. 14F).

These also make it possible to deal with the deterioration of the image depending on brightness and darkness.

In the embodiment, the filter control unit 15 controls the spatial filter process so that an image blur range of the rear liquid crystal cell 3 becomes narrower as illuminance as the detection value of the illuminance sensor 40 becomes lower, and the image blur range of the rear liquid crystal cell 3 becomes wider as the illuminance becomes higher (see FIGS. 13 and 14).

In a case where the surrounding illuminance is low, the flare in the dark state can be made inconspicuous by narrowing the image blur range of the rear liquid crystal cell. In a case where the surrounding illuminance is high, by widening the image blur range of the rear liquid crystal cell, an image defect and apparent contrast deterioration when visually recognizing from an oblique direction in a bright state can be improved.

In the embodiment, the filter control unit 15 controls the spatial filter process so that a transmitted amount of light in the rear liquid crystal cell becomes smaller as illuminance as the detection value of the illuminance sensor 40 becomes lower, and the transmitted amount of light in the rear liquid crystal cell becomes wider as the illuminance becomes higher (see FIG. 14).

In a case where the surrounding illuminance is low, by controlling the peak value d13 so as to reduce the transmitted amount of the rear liquid crystal cell, the flare in the dark state can be made inconspicuous. In a case where the surrounding illuminance is high, by controlling the peak value d13 so as to increase the transmitted amount of the rear liquid crystal cell, an image defect and apparent contrast deterioration when visually recognizing from an oblique direction in a bright state can be improved.

In the embodiment, the example has been described in which when an illuminance change is detected with the detection value of the illuminance sensor 40, the filter control unit 15 performs control to change a filter characteristic stepwise (see FIG. 16).

That is, when the illuminance change is detected, the filter shape according to the new illuminance is not changed at once, but is gradually changed. If the filter shape is rapidly changed, screen flicker may occur due to a difference in response characteristics between the front liquid crystal cell 2 and the rear liquid crystal cell 3. Accordingly, by not directly following a large illuminance change in a short time, it is possible to prevent a phenomenon of flicker occurring on the screen.

In the embodiment, the example has been described in which when the detection value of the illuminance sensor 40 becomes a value that exceeds a predetermined change width from a value when previous filter control is performed, variable control of the spatial filter process according to the illuminance change is performed (see FIG. 17).

That is, the variable control of the spatial filter process is prevented from being unnecessarily performed due to a slight illuminance change. Thus, control that does not excessively respond to a slight illuminance change is achieved, and it is possible to prevent flicker or the like on the screen due to excessive spatial filter control.

In the embodiment, the front image generation unit 52 generates the front image signal by dividing the image signal Sig_in by the rear image signal Sig_RE.

That is, each of gradation values of, for example, R, G, and B as an image signal Sig_in that is a color image signal is divided by the gradation value of the rear image signal Sig_RE after the limit process, so as to obtain the gradation values of R, G, and B as the front image signal.

By dividing the color image signal by the rear image signal, it becomes a state that an appropriate gradation can be obtained as an image in which the rear liquid crystal cell 3 and the front liquid crystal cell 2 are overlapped.

The embodiments give an example in which the dual cell image processing unit 12 includes a light intensity correction unit 53 that multiplies the rear image signal Sig_RE by the correction coefficient kLC according to a light intensity component that is incident on the front liquid crystal cell 2, and the front image generation unit 52 generates the front image signal Sig_FR by dividing the image signal Sig_in by the rear image signal Sig_RE obtained by multiplying by the correction coefficient kLC.

It is possible to obtain the front image signal Sig_FR in consideration of the light intensity component incident on the front liquid crystal cell 2 from the rear liquid crystal cell 3, and a state can be achieved that an appropriate gradation as an image in which the rear liquid crystal cell 3 and the front liquid crystal cell 2 are overlapped.

The display device 90 of an embodiment has a dual cell type liquid crystal display panel 1 in which a display image is generated by light passing through a rear liquid crystal cell and a front liquid crystal cell, and the dual cell image processing unit 12 described above.

The liquid crystal display panel 1 includes a backlight 5, a rear liquid crystal cell 3, a diffusion layer 4, and a front liquid crystal cell 2, which are arranged in this order.

With such a dual liquid crystal cell type liquid crystal display panel 1, it is possible to reduce image quality deterioration caused by surrounding environment illuminance.

Note that the technology disclosed in the present embodiment is not limited to the configurations and setting methods of the embodiments described above, and various modification examples of the configuration example of the dual cell image processing unit 12, the processing example of the filter control unit 15, and the like are conceivable.

Note that effects described in the present description are merely examples and are not limited, and other effects may be provided.

Note that the present technology can employ configurations as follows.

(1)

An image processing device including:

an image processing unit that generates, as an image signal for a display panel in which a display image is generated by light passing through a rear liquid crystal cell and a front liquid crystal cell, a rear image signal for the rear liquid crystal cell and a front image signal for the front liquid crystal cell; and a filter control unit that controls a spatial filter process performed on the rear image signal in the image processing unit on the basis of a detection value of an illuminance sensor that detects illuminance around the display panel.

(2)

The image processing device according to (1) above, in which the image processing unit performs on the rear image signal the spatial filter process to make a transmission pixel range of an image in the rear liquid crystal cell larger than that of an image in the front liquid crystal cell.

(3)

The image processing device according to (2) above, in which the filter control unit variably controls a parameter that changes a filter characteristic in the spatial filter process on the basis of a detection value of the illuminance sensor.

(4)

The image processing device according to (3) above, in which the parameter is a filter passage width of the rear image signal.

(5)

The image processing device according to (3) or (4) above, in which the parameter is a peak width of the rear image signal.

(6)

The image processing device according to any one of (3) to (5) above, in which the parameter is a peak value of the rear image signal.

(7)

The image processing device according to any one of (1) to (6) above, in which the filter control unit controls the spatial filter process so that an image blur range of the rear liquid crystal cell becomes narrower as illuminance as the detection value of the illuminance sensor becomes lower, and the image blur range of the rear liquid crystal cell becomes wider as the illuminance becomes higher.

(8)

The image processing device according to any one of (1) to (7) above, in which the filter control unit controls the spatial filter process so that a transmitted amount of light in the rear liquid crystal cell becomes smaller as illuminance as the detection value of the illuminance sensor becomes lower, and the transmitted amount of light in the rear liquid crystal cell becomes wider as the illuminance becomes higher.

(9)

The image processing device according to any one of (1) to (8) above, in which when an illuminance change is detected with the detection value of the illuminance sensor, the filter control unit controls the spatial filter process so as to change a filter characteristic stepwise.

(10)

The image processing device according to any one of (1) to (9) above, in which when the detection value of the illuminance sensor becomes a value that exceeds a predetermined change width from a value when previous filter control is performed, the filter control unit performs variable control of the spatial filter process according to the illuminance change.

(11)

A display device including:

a display panel in which a display image is generated by light passing through a rear liquid crystal cell and a front liquid crystal cell;

an image processing unit that generates a rear image signal for the rear liquid crystal cell and a front image signal for the front liquid crystal cell;

an illuminance sensor that detects illuminance around the display panel; and a filter control unit that controls a spatial filter process performed on the rear image signal in the image processing unit on the basis of a detection value of the illuminance sensor.

(12)

An image processing method that causes an image processing device perform a procedure including:

an image processing procedure of generating, as an image signal for a display panel in which a display image is generated by light passing through a rear liquid crystal cell and a front liquid crystal cell, a rear image signal for the rear liquid crystal cell and a front image signal for the front liquid crystal cell; and a filter control procedure of controlling a spatial filter process performed on the rear image signal in the image processing procedure on the basis of a detection value of an illuminance sensor that detects illuminance around the display panel.

REFERENCE SIGNS LIST

1 Liquid crystal display panel
2 Front liquid crystal cell
3 Rear liquid crystal cell
4 Diffusion layer
5 Backlight
10 Image processing device
11 Display image processing unit
12 Dual cell image processing unit
15 Filter control unit
20 Front liquid crystal cell drive unit
30 Rear liquid crystal cell drive unit
40 Illuminance sensor
51 Rear image generation unit
52 Front image generation unit
53 Light intensity correction unit
54, 57 Panel gamma processing unit
55, 58 Adjustment unit
56 Rear output unit
57 Front output unit
70 Grayscale conversion unit
72 Gradation value conversion unit
73 LUT
74 Gamma conversion unit
75 Gradation retention unit
78 Combination unit
79 Spatial processing unit
90 Display device

The invention claimed is:

1. An image processing device, comprising:
image processing circuitry configured to generate, as an image signal for a display panel in which a display image is generated by light passing through a rear liquid crystal cell and a front liquid crystal cell, a rear image signal for the rear liquid crystal cell and a front image signal for the front liquid crystal cell; and
filter control circuitry configured to control a spatial filter process performed on the rear image signal in the image processing circuitry based on a detection value of an illuminance sensor that detects illuminance around the display panel, wherein
the filter control circuitry is further configured to control the spatial filter process so that an image blur range of the rear liquid crystal cell becomes narrower as illuminance, which is the detection value of the illuminance sensor, becomes lower, and so that the image blur range of the rear liquid crystal cell becomes wider as the illuminance becomes higher.

2. The image processing device according to claim 1, wherein
the image processing circuitry is further configured to perform, on the rear image signal, the spatial filter process to make a transmission pixel range of an image in the rear liquid crystal cell larger than that of an image in the front liquid crystal cell.

3. The image processing device according to claim 2, wherein
the filter control circuitry is configured to variably control a parameter that changes a filter characteristic in the spatial filter process based on the detection value of the illuminance sensor.

4. The image processing device according to claim 3, wherein the filter control circuitry is further configured to variably control the parameter, which is a filter passage width of the rear image signal.

5. The image processing device according to claim 3, wherein the filter control circuitry is further configured to variably control the parameter, which is a peak width of the rear image signal.

6. The image processing device according to claim 3, wherein the filter control circuitry is further configured to variably control the parameter, which is a peak value of the rear image signal.

7. The image processing device according to claim 1, wherein
the filter control circuitry is further configured to control the spatial filter process so that a transmitted amount of light in the rear liquid crystal cell becomes smaller as the illuminance becomes lower, and the transmitted amount of light in the rear liquid crystal cell becomes wider as the illuminance becomes higher.

8. The image processing device according to claim 1, wherein
when an illuminance change is detected with the detection value of the illuminance sensor, the filter control circuitry is further configured to control the spatial filter process so as to change a filter characteristic stepwise.

9. The image processing device according to claim 1, wherein
when the detection value of the illuminance sensor becomes a value that exceeds a predetermined change width from a value when previous filter control is performed, the filter control circuitry is further configured to perform variable control of the spatial filter process according to the illuminance change.

10. A display device, comprising:
a display panel in which a display image is generated by light passing through a rear liquid crystal cell and a front liquid crystal cell;
image processing circuitry configured to generate a rear image signal for the rear liquid crystal cell and a front age signal for the front liquid crystal cell;
an illuminance sensor configured to detect illuminance around the display panel; and
filter control circuitry configured to control a spatial filter process performed on the rear image signal in the image processing circuitry based on a detection value of the illuminance sensor,
wherein the filter control circuitry is further configured to control the spatial filter process so that an image blur range of the rear liquid crystal cell becomes narrower as illuminance, which is the detection value of the illuminance sensor, becomes lower, and so that the image blur range of the rear liquid crystal cell becomes wider as the illuminance becomes higher.

11. An image processing method, comprising:
generating, as an image signal for a display panel in which a display image is generated by light passing through a rear liquid crystal cell and a front liquid crystal cell, a rear image signal fir the rear liquid crystal cell and a front image signal for the front liquid crystal cell; and controlling a spatial filter process performed on the rear image signal based on a detection value of an illuminance sensor that detects illuminance around the display panel, wherein the controlling step comprises controlling the spatial filter process so that an image blur range of the rear liquid crystal cell becomes narrower as illuminance, which is the detection value of the illuminance sensor, becomes lower, and so that the image blur range of the rear liquid crystal cell becomes wider as the illuminance becomes higher.

* * * * *